(12) United States Patent
Stoffer et al.

(10) Patent No.: US 7,601,425 B2
(45) Date of Patent: Oct. 13, 2009

(54) CORROSION RESISTANT COATINGS CONTAINING CARBON

(75) Inventors: James Stoffer, Rolla, MO (US); Thomas O'Keefe, Rolla, MO (US); Eric Morris, Irvine, CA (US); Pu Yu, Rolla, MO (US); Scott A. Hayes, Rolla, MO (US)

(73) Assignee: The Curators of the University of Missouri, Columbia, MO (US)

( * ) Notice: Subject to any disclaimer, the term of this patent is extended or adjusted under 35 U.S.C. 154(b) by 934 days.

(21) Appl. No.: 10/758,973

(22) Filed: Jan. 16, 2004

(65) Prior Publication Data

US 2004/0186201 A1 Sep. 23, 2004

Related U.S. Application Data

(60) Provisional application No. 60/452,843, filed on Mar. 7, 2003.

(51) Int. Cl.
| | |
|---|---|
| B32B 15/092 | (2006.01) |
| B32B 27/20 | (2006.01) |
| B32B 27/38 | (2006.01) |
| B32B 27/40 | (2006.01) |
| C08L 63/00 | (2006.01) |
| C08K 3/04 | (2006.01) |
| C08K 3/10 | (2006.01) |
| C08K 3/22 | (2006.01) |
| C08K 3/30 | (2006.01) |
| C08K 3/32 | (2006.01) |

(52) U.S. Cl. ................ 428/418; 428/413; 428/414; 428/416; 428/423.1; 523/457; 523/468; 524/401; 524/403; 524/414; 524/417; 524/418; 524/423

(58) Field of Classification Search ............ 428/413, 428/414, 416, 418; 523/400, 440, 457, 468; 524/1, 401, 403, 414, 417, 418, 423, 495, 524/847

See application file for complete search history.

(56) References Cited

U.S. PATENT DOCUMENTS

| | | | |
|---|---|---|---|
| 2,576,845 A | 11/1951 | McDonald | |
| 3,790,453 A | 2/1974 | Wanamaker et al. | |
| 3,837,894 A | 9/1974 | Tucker, Jr. | |
| 3,951,667 A | 4/1976 | Kogure et al. | 106/1 |
| 3,990,920 A | 11/1976 | De Ridder et al. | 148/6.2 |
| 4,212,674 A | 7/1980 | Strauch | 106/14.05 |
| 4,283,312 A | 8/1981 | Crivello | 260/18 EP |
| 4,370,256 A | 1/1983 | Oakes | |
| 4,405,763 A | 9/1983 | Kooymans et al. | 525/438 |
| 4,474,607 A | 10/1984 | Goldie et al. | 106/14.39 |
| 4,488,578 A | 12/1984 | Tseung et al. | 138/146 |
| 4,491,611 A | 1/1985 | Barnhoorn et al. | 427/386 |
| 4,497,667 A | 2/1985 | Vashi | 148/6.15 R |
| 4,501,832 A | 2/1985 | Albers | |
| 4,517,030 A | 5/1985 | Yamamoto et al. | 148/6.15 R |
| 4,522,879 A * | 6/1985 | Krueger | 428/323 |
| 4,537,805 A | 8/1985 | Lin | 427/54.1 |
| 4,544,581 A | 10/1985 | Peloski | 427/383.7 |
| 4,749,550 A | 6/1988 | Goldie et al. | 422/19 |
| 4,849,297 A | 7/1989 | Mansell et al. | 428/457 |
| 4,869,964 A | 9/1989 | Mazany | 428/418 |
| 4,876,305 A | 10/1989 | Mazany | 524/401 |
| 4,895,881 A | 1/1990 | Bigner | 523/122 |
| 4,988,755 A | 1/1991 | Dickens, Jr. et al. | 524/401 |
| 4,999,250 A | 3/1991 | Richardson et al. | 428/457 |
| 5,013,381 A | 5/1991 | Cayless et al. | 156/281 |
| 5,037,478 A | 8/1991 | Okai et al. | 106/479 |
| 5,041,241 A | 8/1991 | Fletcher | 252/387 |
| 5,041,486 A | 8/1991 | Kissel | 524/377 |
| 5,041,487 A | 8/1991 | Kissel | 524/377 |
| 5,061,314 A | 10/1991 | Collier et al. | 106/14.05 |
| 5,064,468 A | 11/1991 | Okai et al. | 106/14.12 |
| 5,089,066 A | 2/1992 | Hamada et al. | 148/302 |
| 5,162,413 A | 11/1992 | Kissel | 524/337 |
| 5,166,248 A | 11/1992 | Kissel | 524/398 |
| 5,173,206 A | 12/1992 | Dickens, Jr. et al. | 252/62.54 |
| 5,175,202 A | 12/1992 | Kissel | 524/398 |
| 5,192,374 A | 3/1993 | Kindler | |

(Continued)

FOREIGN PATENT DOCUMENTS

DE      4115625      11/1992

(Continued)

OTHER PUBLICATIONS

JPO abstract of JP 01-319574.*

(Continued)

*Primary Examiner*—Michael J Feely
(74) *Attorney, Agent, or Firm*—Schwegman, Lundberg & Woessner, P.A.

(57) ABSTRACT

A coating composition comprising an effective corrosion-inhibiting amount of a carbon pigment is provided. In one embodiment, the corrosion-inhibiting carbon pigment is further comprising other components such as extenders, including neutral to slightly acidic generating extenders and acidic generating extenders, are earth compounds, amino acids and amino acid derivatives, gelatin and gelatin derivatives, organic-based exchange resins, and combinations thereof, to enhance the corrosion resistance of the resultant coating film. In one embodiment, the carbon pigment is a surface-modified carbon pigment. The coating compositions have good adhesion to substrates such as metals, including aluminum and aluminum alloys.

54 Claims, No Drawings

U.S. PATENT DOCUMENTS

| | | | |
|---|---|---|---|
| 5,198,487 A | 3/1993 | Kissel | 524/403 |
| 5,221,371 A | 6/1993 | Miller | |
| 5,244,956 A | 9/1993 | Miller | 524/403 |
| 5,298,148 A | 3/1994 | Yasuoka et al. | 205/50 |
| 5,322,560 A | 6/1994 | DePue et al. | 106/404 |
| 5,322,864 A | 6/1994 | Sugimoto et al. | 523/457 |
| 5,338,347 A | 8/1994 | Rohr et al. | 106/14.44 |
| 5,362,335 A | 11/1994 | Rungta | |
| 5,407,471 A | 4/1995 | Rohr et al. | 106/14.44 |
| 5,437,937 A | 8/1995 | Cayless | 428/626 |
| 5,458,678 A | 10/1995 | Armstrong et al. | 106/14.41 |
| 5,531,931 A | 7/1996 | Koefod | |
| 5,540,981 A | 7/1996 | Gallagher et al. | 428/220 |
| 5,587,059 A | 12/1996 | Yamoto et al. | |
| 5,587,142 A | 12/1996 | Horwitz et al. | 423/658.5 |
| 5,635,548 A | 6/1997 | Kittle et al. | 523/220 |
| 5,637,641 A | 6/1997 | Becker et al. | 525/102 |
| 5,656,074 A | 8/1997 | Collier et al. | 106/454 |
| 5,661,219 A | 8/1997 | Nakane et al. | 525/166 |
| 5,707,465 A | 1/1998 | Bibber | |
| 5,770,216 A | 6/1998 | Mitchnick et al. | 428/402 |
| 5,807,954 A | 9/1998 | Becker et al. | 528/25 |
| 5,814,410 A * | 9/1998 | Singer et al. | 428/423.1 |
| 5,866,652 A | 2/1999 | Hager et al. | 524/701 |
| 5,868,819 A | 2/1999 | Guhde et al. | 106/14.14 |
| 5,868,820 A | 2/1999 | Claffey | 106/14.44 |
| 5,871,839 A * | 2/1999 | Boyd et al. | 428/328 |
| 5,897,948 A | 4/1999 | Sakon et al. | 428/328 |
| 5,932,083 A | 8/1999 | Stoffer et al. | |
| 5,958,578 A | 9/1999 | Blohowiak et al. | |
| 5,964,928 A | 10/1999 | Tomlinson | 106/14.21 |
| 5,996,500 A | 12/1999 | Findley | 102/202.8 |
| 6,022,425 A | 2/2000 | Nelson et al. | |
| 6,030,571 A | 2/2000 | Nakane et al. | 264/331.12 |
| 6,068,711 A | 5/2000 | Lu et al. | |
| 6,077,885 A | 6/2000 | Hager et al. | 523/445 |
| 6,139,610 A | 10/2000 | Sinko | 106/14.44 |
| 6,168,868 B1 | 1/2001 | Hauser et al. | 428/457 |
| 6,174,609 B1 | 1/2001 | Katsumi et al. | 428/450 |
| 6,176,907 B1 | 1/2001 | Glausch | 106/14.44 |
| 6,190,780 B1 | 2/2001 | Shoji et al. | 428/472 |
| 6,200,672 B1 | 3/2001 | Tadokoro et al. | 428/328 |
| 6,211,285 B1 | 4/2001 | Grunbauer et al. | 524/591 |
| 6,214,132 B1 | 4/2001 | Nakayama et al. | 148/254 |
| 6,217,674 B1 | 4/2001 | Gray et al. | 148/247 |
| 6,221,473 B1 | 4/2001 | Aubert et al. | 428/221 |
| 6,228,513 B1 | 5/2001 | Jaslier et al. | 428/639 |
| 6,248,184 B1 | 6/2001 | Dull et al. | 148/275 |
| 6,254,980 B1 | 7/2001 | Tadokoro et al. | 428/323 |
| 6,270,884 B1 | 8/2001 | Guhde et al. | 428/323 |
| 6,294,006 B1 | 9/2001 | Andou | 106/14.05 |
| 6,306,276 B1 | 10/2001 | Nobe et al. | |
| 6,312,812 B1 | 11/2001 | Hauser et al. | 428/412 |
| 6,312,813 B1 | 11/2001 | Miyatake et al. | 428/418 |
| 6,332,937 B1 | 12/2001 | Jaslier et al. | 148/518 |
| 6,334,940 B1 | 1/2002 | Muramoto et al. | 204/488 |
| 6,342,554 B1 | 1/2002 | Kishikawa et al. | 524/407 |
| 6,383,307 B1 | 5/2002 | Kucera et al. | 148/251 |
| 6,387,498 B1 | 5/2002 | Coulter et al. | 428/403 |
| 6,457,943 B1 | 10/2002 | Olsen et al. | 416/238 |
| 6,476,102 B1 | 11/2002 | Chung et al. | 523/409 |
| 6,478,860 B1 | 11/2002 | Nakayama et al. | 106/14.05 |
| 6,485,549 B1 | 11/2002 | Novak et al. | 106/14.44 |
| 6,506,245 B1 | 1/2003 | Kinney et al. | 106/493 |
| 6,506,899 B1 | 1/2003 | Simms | 544/222 |
| 6,511,532 B2 | 1/2003 | Matzdorf et al. | |
| 6,537,678 B1 | 3/2003 | Putnam et al. | 428/469 |
| 6,589,324 B2 | 7/2003 | Kamo et al. | 106/14.12 |
| 6,630,523 B2 * | 10/2003 | Hagiwara et al. | 523/457 |
| 6,716,370 B2 | 4/2004 | Kendig | |
| 6,818,116 B2 | 11/2004 | Stoffer et al. | |
| 2001/0024729 A1 | 9/2001 | Heimann et al. | 428/469 |
| 2001/0041757 A1 | 11/2001 | Sakamoto et al. | 523/514 |
| 2001/0055669 A1 | 12/2001 | Schultz et al. | 428/173 |
| 2002/0003093 A1 | 1/2002 | Dull et al. | 205/203 |
| 2002/0006524 A1 | 1/2002 | Jaslier et al. | 428/632 |
| 2002/0023694 A1 | 2/2002 | Kucera et al. | 148/240 |
| 2002/0043649 A1 | 4/2002 | Mansfield et al. | 252/387 |
| 2002/0082338 A1 * | 6/2002 | Furuya et al. | 524/588 |
| 2002/0179189 A1 | 12/2002 | Homma et al. | |
| 2002/0193485 A1 * | 12/2002 | Hagiwara et al. | 524/405 |
| 2003/0024432 A1 | 2/2003 | Chung et al. | |
| 2003/0044515 A1 | 3/2003 | Sandhage | |
| 2003/0054193 A1 * | 3/2003 | McCollum et al. | 428/626 |
| 2003/0082368 A1 | 5/2003 | Reuter et al. | |
| 2003/0221590 A1 | 12/2003 | Sturgill et al. | |
| 2003/0230363 A1 | 12/2003 | Sturgill et al. | |
| 2003/0234063 A1 | 12/2003 | Sturgill et al. | |
| 2004/0005478 A1 | 1/2004 | Kendig et al. | |
| 2004/0011252 A1 | 1/2004 | Sturgill et al. | |
| 2004/0016363 A1 | 1/2004 | Phelps et al. | |
| 2004/0016910 A1 | 1/2004 | Phelps et al. | |
| 2004/0020568 A1 | 2/2004 | Phelps et al. | |
| 2004/0026260 A1 | 2/2004 | Stoffer et al. | |
| 2004/0026261 A1 | 2/2004 | Stoffer et al. | |
| 2004/0028820 A1 | 2/2004 | Stoffer et al. | |
| 2004/0104377 A1 | 6/2004 | Phelps et al. | |
| 2004/0175587 A1 | 9/2004 | Kendig | |
| 2004/0186201 A1 | 9/2004 | Stoffer et al. | |
| 2004/0249023 A1 | 12/2004 | Stoffer et al. | |
| 2004/0249043 A1 | 12/2004 | Stoffer et al. | |
| 2006/0063872 A1 | 3/2006 | Teachout et al. | |

FOREIGN PATENT DOCUMENTS

| | | | |
|---|---|---|---|
| EP | 0902103 A1 | | 3/1999 |
| EP | 0931597 A1 | | 7/1999 |
| EP | 1125989 A1 | | 8/2001 |
| FR | 2058759 | | 5/1971 |
| JP | 55065326 A | | 5/1980 |
| JP | 01-319574 | * | 12/1989 |
| JP | 05-117589 | | 5/1993 |
| WO | WO-8806639 | | 9/1988 |
| WO | WO-0214586 A1 | | 2/2002 |
| WO | WO 02/31064 A1 | | 4/2002 |
| WO | WO-2004065497 A3 | | 8/2004 |

OTHER PUBLICATIONS

Derwent abstract of JP 01-319574.*
Aldykiewicz, Jr., et al., "Studies of the Formation of Cerium Rich Protective Films Using X-Ray Absorption Near-Edge Spectroscopy and Rotating Disk Electrode Methods", *J. Electrochem. Soc.*, vol. 143, No. 1, (Jan. 1996), 147-153.
Aldykiewicz, Jr., et al., "The Investigation of Cerium as a Cathodic Inhibitor for Aluminum-Copper Alloys", *J. Electrochem. Soc.*, vol. 142, No. 10, (Oct. 1995), 3342-3350.
Davenport, et al., "X-Ray Absorption Study of Cerium in the Passive Film Aluminum", *J. Electrochem. Soc.*, vol. 136, No. 6, (Jun. 1989), 1837-1838.
Davenport, et al., "Xanes Investigation of the Role of Cerium Compounds as Corrosion Inhibitors for Aluminum", *Corrosion Science*, vol. 32, No. 5/6, (1991), 653-663.
Fujita, et al., "Fabrication of Co-Ce-O Films by Metal-Oxide Co-Electrodeposition Method From Reaction Solution Including A Complexing Agent", *Nippon Oyo Jiki Gakkaishi*, vol. 25, No. 4-2, (2001), 883-886.
Hinton, et al., "Cerium Conversion Coatings for the Corrosion Protection of Aluminum", *Materials Forum*, vol. 9, No. 4, (1986), 162-173.
Hinton, et al., "Cerium Oxide Coatings for Corrosion Protection of Aluminum Alloys", *Materials Australasia*, (Jan./Feb. 1987), 18-20.
Hinton, "Corrosion Inhibition with Rare Earth Metal Salts", *Journal of Alloys and Compounds*, 180, (1992), 15-25.

Hinton, "New Approaches to Corrosion Inhibition with Rare Earth Metal Salts", *Corrosion 89*, Paper 170, NACE,(Apr. 17-21, 1989).

Hinton, et al., "The Corrosion Inhibition of Zinc with Cerous Chloride", *Corrosion Science*, 29, (1989), 967-984.

Hinton, et al., "The Inhibition of Aluminium Alloys Corrosion by Cerous Cations", *Metals Forum*, vol. 7, No. 4, (1984), 211-217.

Mansfield, et al., "Corrosion Protection of Al Alloys and Al based Metal Matrix", *Corrosion 88*, Paper 380, NACE,(Mar. 21-25, 1988).

Weiser, *The Hydrous Oxides*, McGraw-Hill Book Company, Inc., (1926), 253-259.

Hayes, S., et al., "Environmentally compliant aircraft coatings", *Polymer Materials Science and Engineering*, 85, (2001),140-141.

Hayes, S. A., et al., "The phase stability of cerium species in aqueous systems—I. E-pH diagram for the Ce-HClO4-H2O system", *Journal of the Electrochemical Society*, 149(12), (Dec. 2002),PC623-C630.

Hinton, B., et al., "The corrosion protection properties of an hydrated cerium oxide coating on aluminum", *Proc. 13th Int. Corros. Conqr.*, (1996),Paper 337/1-Paper 337/7.

Morris, E. L., et al., "The use of inhibitors to improve the corrosion protection of E-coat systems on aluminum alloys", *Polymer Materials Science and Engineering*, 78, (1998),172-173.

Pourbaix, M., "Atlas of Electrochemical Equilibria in Aqueous Solutions", Oxford, New York, (1966), 183-197.

Schuman, Thomas P., et al., "Cerium-based Inhibitors of Aluminum Corrosion", *Proceedings of the Waterborne, Higher Solids, and Powder Coatings Symposium*, (Feb. 6-8, 2002),371-382.

Schuman, Thomas P., et al., "The Practical Use of SRET in Surface Corrosion Assessments", *Gateway Coatings Symposium*, St. Louis, MO, (Jun. 2002).

Shahin, A, et al., "XPS characterization of Ce(III-IV) complexes", *Abstracts of Papers of the American Chemical Society*, 224(1), (2002).

"2416.003US1 Response to Non-Final Office Action Apr. 19, 2007".

"2416.003US1 Response to Non-Final Office Action Jun. 27, 2006".

"423.021WO1 International Preliminary Report on Patentability Aug. 4, 2005".

"423.021WO1 International Search Report and Written Opinion Oct. 22, 2004".

"423.025US1 Non-Final Office Action May 19, 2005".

"423.025WO1 International Preliminary Report on Patentability Aug. 4, 2005".

"423.025WO1 International Search Report and Written Opinion Oct. 22, 2004".

"423.027US1 Non-Final Office Action Oct. 19, 2006".

"423.027US1 Non-Final Office Action Dec. 30, 2005".

"U.S. Appl. No. 10/346,374, Preliminary Amendment filed Feb. 28, 2005", 27 pgs.

"U.S. Appl. No. 10/346,374, Preliminary Amendment filed Jul. 2, 2004", 25 pgs.

"U.S. Appl. No. 10/346,374, Restriction Requirement mailed Dec. 28, 2004", 6 pgs.

"U.S. Appl. No. 10/758,972, Non-Final Office Action mailed Oct. 19, 2006", 15 pgs.

"U.S. Appl. No. 10/758,972, Preliminary Amendment filed Aug. 20, 2004", 19 pgs.

"U.S. Appl. No. 10/758,972, Preliminary Amendment filed Aug. 22, 2005 in response to Restriction Requirement mailed Jul. 22, 2005", 24 pgs.

"U.S. Appl. No. 10/758,972, Restriction Requirement mailed Jul. 22, 2005", 6 pgs.

-,"U.S. Appl. No. 10/758,972 Final Office Action mailed Dec. 31, 2008", 11 pgs.

2004205892, "Australian application Serial No.—2004205892 Examination Report mailing dt Nov. 13, 2008", 3.

2001295609, "Australian application Serial No.—2001295609", Wietzoreck, Hardy, et al.

"U.S. Appl. No. 10/758,972, Response filed Sep. 24, 2008 to Non-Final Office Action mailed Jun. 9, 2008", 20 pgs.

"U.S. Appl. No. 10/758,972, Supplemental Amendment filed May 19, 2008", 18 pgs.

"U.S. Appl. No. 10/758,972 Response to Final Office Action filed Mar. 14, 2008", 19 pgs.

"International Application Serial No. 200480007366.6, First Office Action mailed May 25, 2007", 16 pgs.

"International Application Serial No. PCT/US2004/001143, Preliminary Search Report mailed Jun. 30, 2004", 9 pgs.

"Australian Application Serial No. 2004205901, First Examiner Report mailed Feb. 17, 2009", 2 pgs.

* cited by examiner

CORROSION RESISTANT COATINGS CONTAINING CARBON

CROSS-REFERENCE TO RELATED APPLICATIONS

This application claims the benefit under 35 U.S.C. 119 (e) of U.S. Provisional Application No. 60/452843 filed on Mar. 7, 2003, which is hereby incorporated by reference in its entirety.

STATEMENT OF GOVERNMENT RIGHTS

This invention was made with Government support under grant number AFOSRF49620-96-0140 and F33615-97-D5009 awarded by the United States Air Force. The Government may have certain rights in the invention.

RELATED APPLICATIONS

This application is related to U.S. Ser. No. 10/346,374, entitled "Corrosion Resistant Primer Coatings Containing Rare Earth Compounds for Protection of Metal Substrates" filed on Jan. 17, 2003, which is incorporated herein by reference.

TECHNICAL FIELD

This invention relates to corrosion resistant coatings, and, in particular, this invention relates to corrosion resistant coatings containing carbon.

BACKGROUND

Coatings are employed for a number of reasons. Product coatings or industrial coatings are typically applied in a factory on a given substrate or product, such as appliances, automobiles, aircraft, and the like. Many industries, including the aircraft industry, typically employ coating systems that provide both corrosion protection and enhanced performance.

In order to improve the corrosion resistance of a metal substrate, corrosion inhibitive pigments or additives are typically used in the coatings applied to the substrate. A common corrosion inhibitive pigment is strontium chromate, which provides excellent corrosion resistance. However, in recent years there has been widespread concern over the use of chromates, as they are known to be highly toxic and carcinogenic. Furthermore, the disposal of chromate materials is becoming increasingly difficult as municipal and government regulations are becoming more stringent.

As a result, there have been attempts to produce corrosion resistant coatings by using environmentally acceptable corrosion inhibitive pigments or additives. However, these coatings are problematic in that some of the pigments or additives used are either not compatible with the paint or cause the paint to peel off the substrate. Some are actually known to accelerate the corrosion process.

Thus there is a need to provide corrosion resistant coatings that are effective, yet not based on chromates.

SUMMARY

A coating composition comprising an effective corrosion-inhibiting amount of a corrosion-inhibiting carbon pigment is provided. In one embodiment, the corrosion-inhibiting carbon pigment is combined with one or more neutral to slightly acidic generating extenders (e.g., metal sulfates, phosphates, etc.), rare earth compounds (e.g., oxides, oxide solid solutions and mixtures thereof, salts, rare earth complexes, and the like), amino acids and amino acid derivatives, gelatin and gelatin derivatives, organic-based exchange resins, and combinations thereof, to enhance the corrosion resistance of the resultant coating film. In one embodiment, the corrosion-inhibiting carbon pigment is a surface-modified corrosion-inhibiting carbon pigment.

The invention further provides a coating system. In one embodiment, a coating system comprising one or more pretreatment coatings applied to a substrate to form a pretreated substrate; and an effective corrosion-inhibiting amount of a corrosion-inhibiting carbon pigment applied to the pretreated substrate is provided. In one embodiment, there are no pretreatment coatings. In one embodiment, the corrosion-inhibiting carbon pigment is a surface-modified corrosion-inhibiting carbon pigment. In another embodiment, the corrosion-inhibiting carbon pigment is combined with one or more neutral to slightly acidic generating extenders or one or more acidic generating extenders. In other embodiments, the corrosion-inhibiting carbon pigment is combined with any type of extender known in the art. In one embodiment, the coating system includes a topcoat. In one embodiment the coating system is a resin coating. In one embodiment, the coating system is selected from the group consisting of a UV-coating system, electrolytic coating (e-coating) system, applique, powder coating system and microwave coating system. In one embodiment, the substrate is a metal substrate selected from the group consisting of aluminum and aluminum alloys, bare and galvanized steel, zinc, zinc alloys, magnesium and magnesium alloys, copper and bronze.

The invention further provides a method of preparing a coating composition comprising preparing a paint formulation and adding an effective corrosion-inhibiting amount of a corrosion-inhibiting carbon pigment to the paint formulation to produce a coating composition. In one embodiment, the corrosion-inhibiting carbon pigment is a surface-modified corrosion-inhibiting carbon pigment. In one embodiment the method further comprises pre-dispersing the corrosion-inhibiting carbon pigment with a dispersant.

The invention further provides a method of using a coating composition comprising providing a substrate to be coated and coating the substrate with a coating composition having an effective corrosion-inhibiting amount of a corrosion-inhibiting carbon pigment. In one embodiment, the coating is applied by any conventional method, including, but not limited to, spraying brushing, rolling and dipping. In one embodiment, the method further comprises applying a topcoat.

The coating compositions described herein have excellent corrosion resistance performance, while maintaining acceptable levels of paint adhesion properties. The coating compositions are useful in many industries, including, but not limited to, the aerospace and aircraft industries.

DETAILED DESCRIPTION OF THE EMBODIMENTS

In the following detailed description, embodiments are described in sufficient detail to enable those skilled in the art to practice the invention. Other embodiments may be utilized and structural, logical and other changes may be made without departing from the spirit and scope of the present invention. The following detailed description is, therefore, not to be taken in a limiting sense. The detailed description that follows begins with a section on terminology, followed by an overview on carbon and a description of various embodiments of the invention. A series of examples is presented next followed by a brief conclusion.

Terminology

As used herein, the term "substrate" refers to a structure having a surface that can be cleaned and/or protected and/or modified to provide unique properties. A "substrate" is not limited to any particular type of material, although in terms of applying a corrosion inhibiting coating, such substrates are typically metal. However, corrosion inhibiting coatings can also be applied to other substrates, such as a polymeric substrate (e.g., coated metallic substrate). A corrosion inhibiting coating can also be applied to a composite substrate, such as a substrate made with carbon fibers and epoxy resin. Although a composite substrate does not corrode, a corrosion inhibiting coating can still be used with a composite substrate to provide surface protection and/or other unique properties to the substrate, although the coating must be compatible with the substrate material. In some instances, although the majority of the substrate can be made from a composite material and therefore not need protection from corrosion, the presence of other metallic surfaces within the desired coating area, e.g., metallic rivets, requires the use of a corrosion inhibiting coating.

As used herein, the term "conversion coated substrate" refers, in most instances, to an aqueous solution in contact with a metal substrate having the same element. A conversion coating is deposited on a metal substrate with an external driving force to initiate electron transfer so that precipitation occurs. The external driving force can be an electric current or the electric current can be generated by the substrate itself. Essentially, contact between the coating and metal surface causes the metal surface to be converted to a different material, e.g., from an oxide to a phosphate, resulting in the precipitated cation from the substrate metal becoming a part of the coating itself. Use of a conversion coating is known to improve adherence of a subsequent polymeric material (e.g., paint, sealant, etc.) to the metal substrate and also improve short-term resistance (i.e., two weeks or less) of the metal substrate to corrosion. Additionally, those skilled in the art often refer to an aqueous solution in contact with a metal substrate of a different element as a conversion coating, and such coatings are considered to be included within this definition. Although these coatings can be deposited with an external driving force, it is not a requirement. With these types of coatings, the substrate dissolves, generating precipitation of the coating. For example, solutions containing chrome, iron or rare earth ions are known to dissolve aluminum or steel, causing the chrome, iron or rare earth ions, respectively, to precipitate to form compounds, such that the coating now contains an element in common with the substrate.

As used herein, the term "ionic exchange resin" refers to an organic-based resin capable of exchanging ions having a like charge in a local environment with a similarly charged ion incorporated into the resin matrix. An "ionic exchange resin" is generally considered a type of additive.

As used herein, the term "polymeric resin" refers to an organic based polymer used to incorporate inhibitors into a liquid polymeric material. A "polymeric resin" is typically considered a type of binder.

As used herein, the term "pretreatment" refers to any surface modification of a substrate that enhances the substrate for subsequent processing. Such surface modification can include one or more operations, including, but not limited to cleaning (to remove impurities and/or dirt from the surface) and/or application of one or more coatings, as is known in the art. Pretreatment has many benefits, such as improved adhesion of a subsequent coating to the pretreated substrate. For applications where corrosion resistance is desired, and depending on the nature of the substrate to be pretreated, the pretreatment coating can comprise at least one corrosion inhibitor. A conversion coating is one type of pretreatment.

As used herein, the term "binder" refers to any film-forming polymeric material which can be used to make coatings. The polymeric material can be either organic or inorganic. Organic binders have a carbon-containing backbone and inorganic binders generally have a silicone backbone. Organic binders are made up of organic monomers and oligomers from which the binders generally derive their names. Examples of these would be acrylic, epoxy, urethane, melamine, and so forth. Binders include epoxy-based resin binders such as a water reducible epoxy-polyamide system (for organic polymeric materials) or non epoxy-based resin binders such as urethanes, ureas, acrylates, alkyds, melamines, polyesters, vinyls, vinyl esters, silicones, siloxanes, silicates, sulfides, sulfones, epoxy novilacs, epoxy phenolics, drying oils, and hydrocarbon polymers, and the like.

As used herein, the term "paint" refers to a mixture of a binder (referred to above), typically at least one pigment (as referred to herein), typically at least one solvent or mixture of solvents, and a curing agent. Optionally one or more additives can be included as well. A paint is applied to a substrate in a wet or "not fully cured" condition and dries over time (i.e., solvent evaporates) either naturally or by accelerated means (e.g., UV-cured system) to form a film or "cured" paint. A paint can be applied to a substrate as a primer layer (i.e., primer coating, which is intended to include self-priming topcoat), an intermediate layer (i.e., paint layer) and/or a topcoat layer (i.e., topcoat). A paint can be applied as an intact film, such as an adhesive film or applique.

As used herein, the term "sealant" refers to a polymeric material that does not necessarily contain pigments.

As used herein, the term "water borne" or "water reducible" refers to a paint in which the majority or all of the solvent, i.e., media, is water.

As used herein, the term "solvent borne" refers to a paint in which the majority or all of the solvent/media is an organic solvent.

As used herein, the term "coating" refers to a polymeric material (organic or inorganic) that can be applied either as a liquid (e.g., paint) or solid (e.g., powder) to a substrate to form a polymeric film. Such polymeric materials include, but are not limited to, powder coatings, paints, sealants, conducting polymers, sol gels (e.g.Boegel™ made by Boeing Co. having offices in Chicago, Ill.), silicates, silicones, zirconates, titanates, and the like. A "coating" is comprised of a complex mixture of binders, solvents, pigments and additives. Many coatings have one or more substances from each of the four categories. Coating properties, such as gloss and color, are related to the film surface, i.e., as a two-dimensional entity. However, the bulk properties of a coating are related to its three-dimensional structure. Phase continuity is a volume concept, and the coating performance is dependent on the integrity of the binder phase.

As used herein, the term "topcoat" refers to a mixture of a binder(s), which can be an organic or inorganic based polymer or a blend of polymers, typically at least one pigment,. can optionally contain at least one solvent or mixture of solvents, and can optionally contain at least one curing agent. A topcoat is typically the coating layer in a single or multilayer coating system whose outer surface is exposed to the atmosphere or environment, and its inner surface is in contact with another coating layer or polymeric substrate.

As used herein, the term "self-priming topcoat", also referred to herein as a "direct to substrate coating", refers to a mixture of a binder(s), which can be an organic or inorganic based polymer or blend of polymers, typically at least one pigment, can optionally contain at least one solvent or mixture of solvents, and can optionally contain at least one curing agent. A self-priming topcoat is typically applied directly to a substrate. The self-priming topcoat can optionally be applied to an organic or inorganic polymeric coating, such as a primer or paint film. A self-priming topcoat is typically the coating layer in a single or multi-layer coating system where the outer surface of the coating is exposed to the atmosphere or environment, and the inner surface of the coating is typically in contact with the substrate or optional polymer coating or primer.

As used herein, the term "enhanced self-priming topcoat", also referred to herein as an "enhanced direct to substrate coating" refers to a mixture of functionalized fluorinated binders, such as a fluoroethylene-alkyl vinyl ether in whole or in part with other binder(s), which can be an organic or inorganic based polymer or blend of polymers, typically at least one pigment, can optionally contain at least one solvent or mixture of solvents, and can optionally contain at least one curing agent. An enhanced self-priming topcoat is typically applied directly to a substrate. The enhanced self-priming topcoat can optionally be applied to an organic or inorganic polymeric coating, such as a primer or paint film. An enhanced self-priming topcoat is typically the coating layer in a single or multi-layer coating system where the outer surface of the coating is exposed to the atmosphere or environment, and the inner surface of the coating is typically in contact with the substrate or optional polymer coating or primer.

The topcoat, self-priming topcoat, and enhanced self-priming topcoat can be applied to a substrate, in either a wet or "not fully cured" condition that dries or cures over time, that is, solvent evaporates. The coatings can dry or cure either naturally or by accelerated means for example, an ultraviolet light cured system to form a film or "cured" paint. The coatings can also be applied in a semi or fully cured state, such as an adhesive.

As used herein, the terms "paint formulation", "primer formulation", "topcoat formulation", "self-priming topcoat formulation", and "enhanced self-priming topcoat formulation" refer to a list of ingredients, and/or components, and can also include a list of instructions for preparing and mixing together the ingredients, and/or components to make a coating composition.

As used herein, the terms "mill base", "mill base formulation", "primer mill base", "topcoat mill base" and "base", "base formulation", or "primer base", "topcoat base", "self-priming topcoat base", and "enhanced direct to substrate base" refer to a portion or component of a paint formulation that comprises the majority, if not all, of the pigmentation of the coating composition, as well as some additives.

Many of the components noted below as examples of either pigments or additives can be considered multi-functional, as is known in the art, such that they can properly be considered to be an additive and/or a pigment, depending on the particular application.

As used herein, the term "pigment" refers to a solid particle admixed with a polymeric material that, as the material cures, is incorporated into the final coating and provides volume to the resulting final coating. Pigments are most often colorants, but are considered herein to also include extenders, corrosion inhibiting pigments, matting agents (which can also be used as an additive) and so forth. Besides imparting color and opacity, pigments can influence a variety of coating characteristics. In the final film, pigments constitute the discontinuous phase while the binder forms the continuous phase. Although a "pigment" is traditionally considered to include only soluble materials, it is intended herein for "pigment" to more broadly include solids of varying solubilities, such as calcium sulfate, gypsum, strontium sulfate, magnesium sulfate, and the like. The pigment proportion in coatings is commonly expressed as either a pigment-to-binder (P/B) ratio or pigment volume concentration (PVC).

As used herein, the term "P/B" refers to the ratio of the weight of pigment (P) (including extenders) to the weight of nonvolatile binder (B). The pigment-to-binder ratio is relevant when comparing the same pigment-binder system. Since pigments are much heavier than binders, this weight ratio does not give a realistic impression of the film composition by volume. At the same P/B ratio, lighter pigments will contribute more pigment particles than heavier pigments.

As used herein the term "PVC" refers to the ratio of the volume of pigment (including extenders) to the volume of total nonvolatile material, i.e., pigment and binder, in the final film. The figure is usually expressed as a percentage. PVC is the most prevalent method of describing pigment proportion in coatings. PVC does not account for the volume fraction of air voids in the film. With increasing PVC the binder volume in the final film keeps decreasing. PVC influences the properties of the coating composition and more so as it approaches a point where there is just enough binder to maintain a continuous phase. This point is termed the critical pigment volume concentration (critical PVC, or CPVC). Beyond the CPVC, there is not enough binder to fill the voids between pigment particles, and the binder phase becomes discontinuous, leading to air voids in the coating. Coating properties alter sharply around the CPVC. For instance, properties such as gloss, enamel hold-out, adhesion, blistering, corrosion resistance, and mechanical properties such as tensile strength decrease beyond the CPVC, while porosity, rusting, dry hiding, and stain susceptibility increase above the CPVC. In general, therefore, coatings are formulated below the CPVC level.

As used herein, the term "additive" refers to a solid or liquid component admixed with a polymeric material for the purpose of affecting one or more properties of the cured film. For example, an additive such as a surfactant assists in wetting pigments as is known in the art. Other additives can assist in the development of a particular surface property, such as a rough or smooth surface. Examples of additives include surfactants, silicon matting agents (also noted above in definition for "pigment"), dyes, amino acids, and the like. In some instances an extender or a pigment is used as a colorant additive.

As used herein, the term "carbon pigment" is intended to refer to a wide variety of carbons that can be either elemental carbon or a carbon-containing mixture. With regard to elemental carbon, the carbon pigment can be in many forms, such as crystalline (e.g., graphite), amorphous, partially crystalline or amorphous, i.e., quasi-graphitic forms, "Fullerenes" and any other form of carbon known in the art. (It is noted that amorphous carbon is often considered to be a finely divided graphite or quasi-graphitic material). A "carbon pigment" as referred to herein is not necessarily predominantly carbon. For example, bone black, i.e., bone ash, is a carbon mixture that actually contains only about 10% carbon, with the remaining portion being calcium phosphate. However, it is noted, that in some instances, those skilled in the art have equated carbon black with other terms, such as activated carbon, animal charcoal, Norit™ (made by Norit Americas Inc., having offices in Atlanta, Ga.) and Ultracarbon™ (made by Ultracarbon of Neidernhausen, Germany), and the like, and it is not the intent to limit any reference herein to "carbon black" to any one specific type of material. The various carbon pigments are made by a variety of known manufacturing processes, which impart unique characteristics to the end product. It is further understood that not all carbon pigments are corrosion-inhibiting carbon pigments.

As used herein, the term "corrosion-inhibiting carbon pigment" is an effective amount of a carbon pigment which enhances the corrosion resistance properties of a carbon pigment-containing composition, as compared to a similarly formulated non-carbon pigment containing coating composition.

As used herein, the term "bone black" refers to a carbon pigment made by carbonizing bones. Bone black is also referred to as "bone ash" and "ivory black."

As used herein, the term "carbon black" refers to a carbon pigment comprising a form of carbon manufactured by the pyrolysis of hydrocarbon mixtures, such as heavy petroleum distillates and residual oils, coal-tar products, natural gas and acetylene. As known to those skilled in the art, carbon blacks are generally categorized as acetylene black, channel black, furnace black, lampblack or thermal black, and the surface-modified variations thereof, according to the process by which they are manufactured. Types of carbon black can be characterized by the size distribution of the primary particles, the degree of their aggregation and agglomeration and the various chemicals adsorbed onto the surfaces. An average primary particle diameter in several commercially produced carbon blacks range from between about 10 nm to about 400 nm, while average aggregate diameters range from between about 100 nm to about 800 nm. The term carbon black can also be equated with other forms of carbon as discussed in "carbon pigment" definition.

As used herein, the term "surface-modified carbon pigment" refers to an engineered carbon pigment modified to generate differences in characteristics such as aggregation, porosity, particle size, surface area, surface chemistry, physical form and size distribution. These chemical and physical properties influence surface reactivity and can be varied to achieve the desired properties for a particular coating application.

As used herein, the term "catalyst" or "curing agent" refers to an additive that allows for the curing mechanism to begin when mixed together with the appropriate mill base.

As used herein, the term "extender" or "extender pigment" when used without qualification, refers to a type of pigment that is typically incorporated into a paint formulation to provide volume to the final resulting coating after paint curing, although it can be added for other reasons, such as to reduce cost. An extender can additionally or alternatively be an active component in making a total system more corrosion resistant. Extenders which add volume are often referred to as "fillers" or "extenders/fillers."

As used herein, the term "neutral to slightly acidic generating extender", i.e., "neutral to slightly acidic generating additive", refers to a metal cation and a corresponding oxyanion (meaning those anions having an oxygen combined with one or more nonmetals). Preferred but not required extenders are sulfur, phosphorus and silicon oxyanion-containing compounds. Of particular interest are sulfur, phosphorus and silicon oxyanion-containing salts. A neutral to slightly acidic generating extender can be used alone or in combination with other components to generate a pH environment of between about 4 to about 8 in a coating composition (with the pH of the coating composition determined by standard methods and concentrations known to those of skill in the art). This environment appears to help enhance and optimize transport of the particular inhibitor species being used, from the coating composition to areas of exposed underlying substrate. A neutral to slightly acidic generating extender can itself be acidic, neutral or basic (e.g., $Na_2HPO_4$) and can also add extender properties to the coating composition. In most instances, a neutral to slightly acidic generating extender does not substantially solubilize in the coating composition, thereby adding volume to the composition. Examples of neutral to slightly acidic generating extenders include, but are not limited to, sulfates, sulfites, silicates, phosphates, phosphites, phosphonates, hydrogen sulfate, hydrogen sulfite, mono and di-hydrogen phosphate, mono and di-hydrogen phosphites and mono hydrogen phosphonate. Further examples include oxyphosphorus compounds, such as cerous phosphate and some Group IIA sulfates, such as calcium sulfate, strontium sulfate and the like. However, it is manifestly intended to include within this term neutral to slightly acidic generating extenders, i.e., additives, which are substantially soluble and therefore do not add volume to the composition. Examples include certain sulfates known in the art to not be useful in adding volume but which have shown surprisingly good results as corrosion inhibitors, such as magnesium sulfate and some Group IA sulfates. The precise amount of neutral to slightly acidic generating extender needed to generate the desired pH in the composition will vary depending the type and amount of binders, solvents, pigments and other additives, including other types of extenders present in the coating composition.

As used herein, the term "acidic generating extender", i.e., "acidic generating additive," refers to a metal cation and a corresponding oxyanion (meaning those anions having an oxygen combined with one or more nonmetals). Preferred but not required extenders are sulfur, phosphorus and silicon oxyanion-containing compounds. Of particular interest are sulfur, phosphorus and silicon oxyanion-containing salts. An acidic generating extender can be used alone or in combination with other components to generate a pH environment of less than about 2 to about 4 in a coating composition (with the pH of the coating composition determined by standard methods and concentrations known to those of skill in the art). This environment appears to help enhance and optimize transport of the particular inhibitor species being used, from the coating composition to areas of exposed underlying substrate. An acidic generating extender can itself be acidic or neutral and can also add extender properties to the coating composition. Examples of compounds that are capable of generating a pH environment of between about 2 to about 4 include, but are not limited to certain hydrogen sulfates such as calcium hydrogen sulfate, calcium hydrogen phosphate and calcium di-hydrogen phosphate. Again, it is manifestly intended to include within this term acidic generating extenders that are substantially soluble, thereby not adding volume to the composition. It is possible that the same compound can be properly categorized as both an "acidic generating extender" and a "neutral to slightly acidic generating extender", since it is capable of generating either environment. One example of a compound that can generate either environment includes, but is not limited to, calcium hydrogen phosphate. Additionally, the precise amount of acidic generating extender needed to generate the desired pH in the composition will vary depending on the type and amount of binders, solvents, pigments and other additives present.

As used herein, the term "substantially soluble" refers to a solubility level of more than about one (1) mole per liter of water (mol/L).

As used herein, the term "not substantially soluble" refers to a solubility level of less than about one (1) mol/L.

As used herein, the term "e-coat" or "electrolytic coat" refers to a coating deposited on a substrate with an electrolytic process. This is to be distinguished from a "powder coating" which refers to a coating produced when a dry powder is applied in an electrostatic process and then cured.

As used herein, the term "UV-cured system" refers to a coating system, i.e., one or more coating layers, in which the polymer is cured using ultraviolet light.

As used herein, the term "weight percent (wt %)" when used without qualification, typically refers to the weight percent of a particular solid component, e.g., pigment, extender, etc., as compared with all solid components present, excluding polymeric resins. For example, if the only solid component present in the coating is a corrosion-inhibiting carbon pigment, the corrosion-inhibiting carbon pigment is considered to have a wt % of 100.

As used herein, the term "mixed oxide" refers to a solid solution of a single element having multiple oxidation states and is not intended to refer to a of oxides.

Carbon Overview

Carbon, an element with an atomic weight of 12 that is located in Group IVB in the periodic table, is a major constituent in organic and inorganic chemical applications. The high melting and boiling point provide a desirable level of stability and its atomic structure provides a variety of opportunities for unique bonding, both homopolar and heteropolar. The primary forms of solid carbon are diamond, crystalline and amorphous. The major crystalline phase is graphite, consisting of a sheet-type arrangement of carbon atoms. The carbon sheets can be separated, but are not readily torn. The carbon atoms are bonded in a benzene type arrangement within the sheets, and the sheets are held together by Van der Waals' forces. Electrical conductivity parallel to the sheets is orders of magnitude higher than in the perpendicular direction. The sheets are separated by 3.4 Å, a distance that allows the possibility of intercalation of various species that could subsequently be active in the chemical behavior of the carbon. Other, very special structural forms have also been produced that do not fit into a specific category, such as "Fullerenes."

Carbon pigments, as referred to herein, are used in paints/coatings to affect certain specific physical properties of the coating. For example, carbon pigments have been used as coloring pigments to produce black coloration, and also various shades of gray when mixed with a white coloring pigment such as titanium oxide ($TiO_2$). See, for example, U.S. Pat. No. 6,506,245. To increase the dispersion and wetability of carbon blacks, it is possible to modify the surfaces of carbon black particles using dispersion aids and surfactants. For example, it is known that organosilicones and silicates compounds can be used as surface modifiers. The resulting silicon-modified carbon black products have improved paint compatibility and storage stability and also improved dispersion and mixing properties. Other surface modifiers known to improve dispersive properties of carbon blacks (and other pigments) involve the use of poly alkyl ethers and a resin composing either a polyester or polyacrylate and diamine. See, for example, U.S. Pat. No. 6,506,889.

Conductive grades of carbon pigments are also used as electrostatic dischargers in coatings. See, for example, U.S. Pat. No. 5,996,500 which provides for an electrically dischargeable primer used for firing cartridges in pyrotechnic applications. Carbon coatings can also be used to protect wind turbine blades from lightning strikes by discharging high currents. See, for example, U.S. Pat. No. 6,457,943. Carbon is also used to make a coating surface sufficiently conductive to be weldable or to receive subsequent coatings that can require a conductive surface for application. See, for example, U.S. Pat. No. 6,312,812. Carbon pigments such as carbon blacks are also known in the art to be good absorbers of infrared radiation and are also often used in military coating applications where a low reflectance of infrared is desired.

Because of the numerous structural and physical properties associated with the various types of carbon blacks, carbon blacks can be incorporated into paint formulations for a number of different reasons as noted above. Regarding corrosion resistance, however, until now, carbon blacks were actually thought to reduce the overall corrosion resistance of a coating by increasing the rate of corrosion and galvanic activity of the metal substrates that the coating is supposed to protect. See U.S. Pat. No. 4,544,581.

Carbon blacks are manufactured by an oxidative pyrolysis process that typically uses polycyclic aromatic hydrocarbon feedstock oils as feedstock, as is known in the art. The process calls for an incomplete combustion of the feedstock in the presence of oxygen at elevated temperatures. The resulting carbon black product (e.g., lamp black, gas black or furnace black) is filtered from the off-gassing of the production process. Although all carbon blacks are manufactured using an oxidative pyrolysis process, many process variations are possible, depending on the desired end product. For example, "furnace blacks" are produced by incompletely combusting the carbon black feedstock using a flame. As the furnace black product forms, it is quickly quenched with a water spray and removed from the gas stream. The process for producing "lamp blacks" involves vaporizing and incompletely combusting the carbon feedstock using a controlled air flow and radiant heat. Once the gases are allowed to cool, the lamp black produced is then separated from the gas stream using a filter. The process for producing "gas blacks" involves vaporizing the carbon feedstock in a carrier gas containing hydrogen. The carbon feedstock is combusted using several small flames such that a portion of the gas black produced is deposited onto a cooled roller system, while the remaining gas black is separated from the gas stream in a filter.

Although the resulting products, namely furnace blacks, lamp blacks and gas blacks, respectively, all have some properties in common, each type of carbon black product also has properties unique to the particular processing method used. This includes, but is not limited to, variations in tinting strength, pH, oil adsorption, structure, and so forth. For example, the specific structure of a carbon black product can influence paint viscosity. Specifically, furnace blacks tend to be between about 10 to about 80 nm in particle size, have between about 60 to about 130 in tinting strength, with a pH of between about 6 to about 10. In contrast, lamp blacks have a particle size of between about 110 to about 120 nm, a tinting strength of between about 25 to about 35, with a pH of between about 6 to about 9. Additionally, gas blacks have a particle size of between about 10 to about 30 nm, a tinting strength of between about 90 to about 130, and a pH of between about 4 to about 6. Other types of carbon blacks as referred to herein (e.g., graphite, amorphous carbon, crystalline carbon, activated carbon, conducting carbon, non-conducting carbon, bone black, and so forth) also have their own unique processing methods and, as a result, have properties unique to that method.

Discussion

Compositions

The present invention provides, in one embodiment, coatings containing corrosion-inhibiting carbon pigments in varying concentrations to enhance the corrosion resistance properties of the resulting coating films. In one embodiment, the coatings are aqueous or solvent borne coating compositions applied as liquids, e.g., paint. In other embodiments, the coatings are applied in powder or paste (e.g., solgel) form. In yet other embodiments, the coating is a sealant, conducting polymer, or the like.

The precise amount of corrosion-inhibiting carbon pigment that is considered an effective corrosion-inhibiting amount can vary considerably depending on the type of carbon pigment used, the level of corrosion resistance desired, substrate type, and so forth. Generally, if too little corrosion-inhibiting carbon pigment is added, there will not be sufficient corrosion inhibition in the coating. If too much corrosion-inhibiting carbon pigment is added, a liquid polymeric material will become too viscous to use or even solidify. Care must be taken not to exceed the critical pigment volume concentration (CPVC) of the system, discussed in more detail below.

In one embodiment the corrosion-inhibiting carbon pigment is added to the polymeric material in a pigment volume concentration (PVC) of between about 0.1 to about 65, although the invention is not so limited. In some embodiments it is possible that the PVC is greater than about 65. The corresponding wt % can vary considerably, depending on the density of the corrosion-inhibiting carbon pigment being used. In one embodiment, a PVC range of between about 0.1 to about 65 for the corrosion-inhibiting carbon pigment corresponds with a weight percent of between about 0.1 to about 100% of the total pigment. In another embodiment, a PVC range of between about 0.1 to about 65 corresponds with a weight percent of between about 3 to about 25%. Preferably, the corrosion-inhibiting carbon pigment is present in the coating composition in an amount of between about 0.1 to about 99 weight percent. A more preferred amount is between about 5 to about 55 weight percent.

The corrosion-inhibiting carbon pigments that can be used herein include, but are not limited to, carbon pigments in various forms, such as crystalline forms (e.g., graphite), amorphous forms (e.g., activated carbon, conductive carbon, non-conductive carbon, animal charcoal, decolorizing carbon, and the like), inorganic-dispersed carbon pigments, carbon spheres, surface-modified carbon pigments (e.g., Raven® 1040, Raven® 1250, Ravens® 1255, 5000 Ultra II, and the like, made by Columbian Chemicals Co. having offices in Marietta, Ga.), surfactant and/or resin-dispersed carbon pigments (e.g., Sun Chemical carbon dispersions such as LHD-9303: Sunsperse® Carbon Black Dispersion, U47-2355: Polyversyl® Flushed Color, PLD-2070: Specialty Carbon Black Dispersion, etc., all made by Sun Chemical (The Colors Group) having offices in Cincinnati, Ohio), bone blacks (e.g., Ebonex pigments, such as Cosmic Black 7, a bone black pigment made by Ebonex Inc., having offices in Melvindale, Michigan) and the like, and combinations thereof. Of interest with bone black, is that it contains only about 10% carbon, with the remaining content being primarily calcium phosphate. Table I in Example 1 provides additional information on the various types of carbon pigments that can be used, together with exemplary concentration ranges.

In a preferred embodiment, the corrosion-inhibiting carbon pigment is a surface-modified corrosion-inhibiting carbon pigment. Preferred surface-modified corrosion-inhibiting carbon pigments have a mean particle size of between about 8 nm to about 28 nm; a Nitrogen Surface Area (NSA) surface area (i.e., measurement of total surface area) of between about 86 $m^2/g$ to about 583 $m^2/g$; and a Statistical Thickness Surface Area (STSA) surface area (i.e., measurement of external surface area) of between about 82 $m^2/g$ to about 356 $m^2/g$, as measured by ASTM methods. Examples of these surface-modified corrosion-inhibiting carbon pigments include a corrosion-inhibiting carbon pigment having a mean particle size of about 8 nm, a NSA surface area of about 583 $m^2/g$, and a STSA surface area of about 356 $m^2/g$, as measured by ASTM methods, such as Raven® 5000 Ultra II, commercially available from Columbian Chemicals Co. having office in Marietta, Ga., US; a corrosion-inhibiting carbon pigment having a mean particle size of about 20 nm, a NSA surface area of about 122 $m^2/g$, and a STSA surface area of about 119 $m^2/g$, as measured by ASTM methods, such as Raven® 1255, commercially available from Columbian Chemicals Co. having office in Marietta, Ga., US; a corrosion-inhibiting carbon pigment having a mean particle size of about 21 nm, a NSA surface area of about 113 $m^2/g$, and a STSA surface area of about 102 $m^2/g$, as measured by ASTM methods, such as Raven® 1250, commercially available from Columbian Chemicals Co. having office in Marietta, Ga., US; and a corrosion-inhibiting carbon pigment having a mean particle size of about 28 nm, a NSA surface area of about 86 $m^2/g$, and a STSA surface area of about 82 $m^2/g$, as measured by ASTM methods, such as Raven® 1040, commercially available from Columbian Chemicals Co. having office in Marietta, Ga., US. However, surface-modified corrosion-inhibiting carbon pigments having other particle sizes and surface areas can be used, in addition to surface-modified corrosion-inhibiting carbon pigments having other constituents such as sulfur, ash, residue, etc., as will be understood by those skilled in the art.

Controlling the local environment near the paint and substrate interface is also important for maximum corrosion protection. Local pH and ionic activity can be modified in a favorable way using various pigments with an inherent or surface-modified pH characteristic or by using ionic exchange resins. Incorporation of co-inhibitors, such as rare earth compounds and/or other pigments known as inhibitor species, such as amino acids, together with other types of pigments and/or additives, can be used to further improve the corrosion resistance of these coating systems. In one embodiment, the environment is made neutral or slightly acidic by any suitable means, such as with an acidic inhibitor pigment, although the invention is not so limited. In another embodiment, the environment is made basic by any suitable means.

Extenders also serve as a cost effective substitute for coloring pigments such as titanium dioxide, and can further provide the desired pigment to binder ratios for the coatings. Many of these extenders appear to assist in the activation of inhibitors that can be present in the environment (e.g., in previously applied conversion coatings, in the polymeric coating itself, etc.), thus enhancing the corrosion resistance of the protective coating. In some embodiments, it is thought that certain extenders, namely the neutral to slightly acidic generating extenders and the acidic generating extenders themselves act as corrosion inhibitors.

In one embodiment, neutral to slightly acidic generating extenders or acidic generating extenders are used. In one embodiment, the neutral to slightly acidic generating extenders or acidic generating extenders include Group I and II metal cations. In one embodiment, the neutral to slightly acidic generating extenders or acidic generating extenders include sulfates and phosphates of praseodymium (such as praseodymium(III), (IV) or (III/IV) mixtures), calcium, strontium, barium and magnesium, and the natural forms of these compounds such as gypsum and celestite. Preferably the neutral to slightly acidic generating extenders or acidic generating extenders include calcium, strontium, and barium sulfates and phosphates that do not substantially solubilize in the coating composition, although the invention is not so limited. In one embodiment, the neutral to slightly acidic generating extenders or acidic generating extenders are selected from the group that includes, but is not limited to, sulfates, including metal sulfates (e.g., anhydrous calcium sulfate, hydrated calcium sulfate, strontium sulfate, barium sulfate, hydrated magnesium sulfate, etc.), metal phosphates (e.g., hydrous calcium phosphate, anhydrous calcium phosphate and mono- and di-hydrogen calcium phosphate, etc.). Again, any of the extenders described herein can be used in either natural (mineral) or synthetic form. The acidic extenders can further include non-sulfate, non-phosphate and non-nitrate acidic extenders, such as the Burgess extenders including calcined clays, e.g., calcined kaolin clays, etc., made by the Burgess Pigment Co. having offices in Sandersville, Ga., and the like. However, other metal cations and anions having the aforementioned properties can be used as neutral to slightly acidic extenders in the coating compositions of the present invention, as will be understood by those of skill in the art with reference to this disclosure.

In one embodiment, one or more neutral to slightly acidic generating extenders or acidic generating extenders are used. The amount of extenders used can vary considerably, because some are more efficient in the particular system being used. In one embodiment, extenders are added in a weight percent of between about 1 to about 99% of the total amount of pigments in the coating. In most embodiments the coating contains between about 30 to about 80 wt % of one or more neutral to slightly acidic generating extenders and/or acidic generating extenders. In more preferred embodiments, the coating contains between about 45 to about 75 wt % of neutral to slightly acidic extenders. In a particular embodiment, between about 0.1 to about 3 wt % of one or more types of magnesium sulfate is used. Preferably, the neutral to slightly acidic extender is present in the coating composition in a amount of between about 0.1 to about 99 weight percent. A more preferred amount is between about 25 to about 98 weight percent, and a most preferred amount is between about 80 to about 95 weight percent. In a particular embodiment, in which a chrome conversion coating is used on the substrate together with coating containing a corrosion-inhibiting carbon pigment and a hydrated sulfate extender, good corrosion resistance was observed.

In another embodiment, corrosion-inhibiting carbon pigments are combined instead with conventional basic extenders known in the art including, but not limited to, further including traditional extenders such as calcium oxides (e.g., calcium hydroxide), calcium carbonates, talc, platy talc, silicates, and other known extenders. In one embodiment, the basic extenders have a pH of greater than about 7 up to about 13. The amount of basic extenders added can vary as well, because some are more efficient in a particular system. In yet another embodiment, corrosion-inhibiting carbon pigments are used without any extenders. Particularly useful in this embodiment are corrosion-inhibiting carbon pigments such as bone black, and the like.

Co-inhibitors known in the art can also optionally be employed in the present invention together with the corrosion-inhibiting carbon pigments, and, optionally, any other components described herein (e.g., extenders, etc.). Such co-inhibitors include, but are not limited to, rare earth compounds, metal oxides, borates, metaborates, silicates, phosphates, phosphonates, aniline, polyaniline, and the like. Other co-inhibitors can also be optionally employed in the present invention, such as Nalzan™ (made by NL Industries having offices in Highstown, N.J.), Busan™ (made by Buckman Laboratories having offices in Memphis Tenn.), Halox™ (made by Halox Inc. having offices in Hammond, Ind.), Molywhite™ (made by Sherwin Williams Inc. having offices in Coffeyville, Kans.), and the like. It is appropriate to use only those co-inhibitors that are chemically compatible with the carbon-containing paint formulation.

Rare earth compounds useful in the present invention include, but are not limited to, rare earth oxides, mixed oxides, solid solution oxides, hydrated oxides, salts, triflates, and complexes, such as rare earth complexes using ethylenediamine tetraacetic acid, organic-based ionic exchange resins, etc., and the like. The coating can additionally contain between about 0.1 to about 95 wt % of a rare earth compound co-inhibitor. (In this instance the wt % is in reference to the total wt % of all co-inhibitors present in the coating). In one embodiment, the coating contains between about 0.4 to about 26 wt %, of a rare earth compound co-inhibitor. In one embodiment, the rare earth compounds are based on any of the lanthanide series. In one embodiment the rare earth compounds are selected from the group consisting of praseodymium, cerium and terbium. Praseodymium has provided particularly good results. (See Example 4). In other embodiments, any of the rare earth compounds described in U.S. patent application Ser. No. 10/346,374, entitled, "Corrosion Resistant Coatings," filed on Jan. 16, 2004, which is hereby incorporated by reference in its entirety, are used.

The oxidation state of the rare earth metal employed is also an important consideration when choosing a rare earth compound for a particular application. For example, with regard to praseodymium, in one embodiment praseodymium having an oxidation state of praseodymium (III) is used. In another embodiment a praseodymium (III/IV) mixture is used. In yet another embodiment, praseodymium (IV) is used. The preferred oxidation states of the rare earth compounds can also be a function of the final coating system employed. In one embodiment, the rare earth compound is a praseodymium (III) sulfate. In another embodiment, the rare earth compound is a praseodymium(III/IV) oxide or a praseodymium(III/IV) solid solution. In other embodiments the rare earth compound can be a praseodymium mixed oxide, a praseodymium(III) oxide, a praseodymium(III) hydroxide, a praseodymium(IV) oxide, and any combinations thereof, further including combinations with any other praseodymium or other metals.

In one embodiment the rare earth compound can be a cerium oxide, cerium hydroxide, cerium solid solution mixed oxide, cerium oxide mixture, cerium salt, neodymium oxide, neodymium hydroxide, neodymium solid solution mixed oxide, neodymium oxide mixture, neodymium salt, praseodymium oxide, praseodymium hydroxide, praseodymium solid solution mixed oxide, praseodymium oxide mixture, praseodymium salt, ytterbium oxide, ytterbium hydroxide, ytterbium solid solution mixed oxide, ytterbium oxide mixture, ytterbium salt, yttrium oxide, yttrium hydroxide, yttrium solid solution mixed oxide, yttrium oxide mixture, yttrium salt, terbium oxide, terbium hydroxide, terbium solid solution mixed oxide, terbium oxide mixture, terbium salt, and combinations thereof.

Additives that provide corrosion inhibition can also optionally be employed in the present invention together with the carbon pigments and, optionally, any other additives described herein. In one embodiment, amino acids are used as an additive. Amino acids and/or other additives useful in the present invention include, but are not limited to glycine, arginine, methionine, and derivatives of amino acids, such as methionine sulfoxide, methyl sulfoxide, and iodides/iodates, gelatin and gelatin derivatives, such as animal and fish gelatins, linear and cyclic dextrins, including alpha and beta cyclodextrin, triflic acid, triflates, acetates, organic-based ionic exchange resins, such as organic-based cationic and anionic exchange resins, organic-based ionic exchange resins which have been pre-exchanged or reacted with a rare earth compound. In one embodiment, the additives comprise between about 0.03 to about 5 wt % of the solid components in the polymeric material. In another embodiment, the additives comprise between about 0.1 to about 1 wt % of the solid components in the coating. In a particular embodiment, the coating contains between about 0.03 to about 5 wt % of complexing linear and cyclic dextrins, gelatin, gelatin derivatives and combinations thereof. Of particular interest are arginine, methionine, gelatin and the exchange resins, their success being somewhat dependant on the polymer material being employed.

The ionic exchange resin employed as a complexing agent for the inhibitor can be neutral, cationic or anionic in nature, although both cationic and anionic can be used in the same paint formulation. In one embodiment, the ionic exchange resin comprises between about 0.1 to about 7 wt % of the solid components in the coating. In another embodiment, the ionic exchange resin comprises between about 0.5 to about 3 wt % of the solid components in the coating. The ionic exchange resin can further contain rare earth ionic forms and/or amino acids. In one embodiment, the ionic exchange resin comprises rare earth ion forms, amino acid, amino acid derivative, amine-based complex of a rare earth compound, and combinations thereof, in an amount that is between about 0.1 to about 5 wt % of the solid components in the polymeric material. In another embodiment, this amount is between about 0.5 to about 1.5 wt %.

The binders utilized herein are typically resin binders such as a water reducible epoxy-polyamide system (for organic polymeric materials), but other types of binders can also be used, such as in coatings made from inorganic polymeric materials. Organic polymers include those soluble in water and those soluble in non-aqueous systems and powder coating systems. In one embodiment, film-forming polymers that crosslink upon curing are used. Examples of organic polymers that can be used in embodiments of the present invention include, but are not limited to, epoxy, urethane, urea, acrylate, alkyd, melamine, polyester, vinyl, vinyl ester, silicone, siloxane, silicate, sulfide, sulfone, amides, epoxy novilac, epoxy phenolic, amides, amines, drying oils and hydrocarbon polymers. In one embodiment, the binder is a resin that is not epoxy-based. Such resins include, but are not limited to, urethanes, ureas, acrylates, alkyds, melamines, polyesters, vinyls, vinyl esters, silicones, siloxanes, silicates, sulfides, sulfones, epoxy novilacs, epoxy phenolics, drying oils, and hydrocarbon polymers and the like.

Any suitable type of solvent can be used. In one embodiment, the solvent is an organic based solvent or mixture of solvents, water, or mixture of water and organic based solvents.

The coating compositions of the present invention can optionally also contain color pigments. In general, the color pigment is incorporated into the coating composition in amounts of between about 0.1 to about 80 wt %, usually between about one (1) to about 30 wt % based on total weight of the coating composition (in contrast to wt % of just the solid components). In one embodiment, the optional pigments comprise up to about 25 wt % of the total weight of the coating composition. Color pigments conventionally used in surface coatings include, but are not limited to, inorganic pigments such as titanium dioxide, iron oxide, carbon black, phthalocyanine blue and phthalocyanine green. Metallic flake pigmentation is also useful in aqueous coating compositions of the present invention. Suitable metallic pigments include aluminum flake, zinc, copper bronze flake, and metal oxide coated mica.

Additional additives and pigments can be employed to provide desired aesthetic or functional effects. If desired, the coating compositions of the present invention can contain other optional materials well known in the art of formulated surface coatings. These optional materials are chosen as a function of the coating system and application and can include flow control agents, thixotropic agents (e.g., bentonite clay), anti-gassing agents, organic co-solvents, catalysts, and other customary auxiliaries.

Use of carbon, silicates, etc., to modify the surface of the carbon pigment and other corrosion inhibitors is also possible as is known in the art. Specifically surface-modified pigments blend into the polymeric material more easily. Additionally, the particular manner in which the surface has been modified can also play a role.

The actual particle size of the corrosion-inhibiting carbon pigment particles can also play a role in improving corrosion resistance, with smaller particles providing improved resistance. As a result, it is believed that grinding the corrosion-inhibiting carbon pigment enhances corrosion resistance.

Additionally, use of pre-dispersants, described herein, can also play a role in enhancing corrosion resistance.

With respect to the total amount of all types of added pigment, there is a point, known as the critical pigment volume concentration (critical PVC) above which the coating will not properly function. However, below this level, any desired amount of pigment can be added, and such amount is often referred to as a total PVC. In one embodiment, the critical PVC is 65, although the invention is not so limited. In certain embodiments, it can be important to stay below the critical PVC sufficiently to provide an optimum composition. In one embodiment, the total PVC ranges from between about 20 to about 45. The total PVC range can correlate with an almost limitless range of pigment content based on weight. In one embodiment, the weight percent of a single pigment present in a coating, e.g., a corrosion-inhibiting carbon pigment, ranges from between about 0.1 to about 100 wt %, as discussed above. More preferred ranges will depend on many factors, such as the type of pigment used, the degree of corrosion resistance required, the coating formulation being employed, the surface being treated, and so forth. See Tables 1 and 2 in Example 1 for information on exemplary concentration ranges.

The coating compositions described herein all having good adhesion to substrates. The coatings further demonstrate good to excellent corrosion resistance as defined by the Keller Corrosion Rating Scales developed by The Boeing Co., having offices in St. Louis, Mo., in which results, of "3", "4" and "A" are considered "good" and results of "1 " "A" are considered excellent (See Table 6 in Example 4 for a description of the various ratings)., Examples of substrates on which the coating compositions can be used on include, but are not limited to, aluminum, aluminum alloys, cast aluminum, magnesium, magnesium alloys, titanium, zinc, zinc-coated steel, zinc alloys, zinc-iron alloys, zinc-aluminum alloys, bare and galvanized steel, stainless steel, pickled steel, iron compounds, magnesium alloys, substrates having metal pretreatments (e.g., chrome-based conversion coatings, anodized coatings, cobalt-based conversion coatings, phosphate-based conversion coatings, silica-based conversion coatings, rare earth-based conversion coatings, stainless metal pretreatments, and the like), polymers, polymer/metal composites, coated substrates, and the like.

Conversion coatings onto which the coatings of the present invention can be applied include, but are not limited to, cerium conversion coatings (CeCC), praseodymium conversion coatings (PrCC), phosphate conversion coatings, zinc-type conversion coatings, chromium conversion coatings (CrCC), and the like, as is known in the art. In a specific embodiment, the CrCC used are Alodine® chrome and non-chrome conversion coatings made by Henkel Surface Technologies having offices in Madison Heights, Michigan (e.g., Alodine® 1000, 1200, 1200S, 2000, and the like). In another specific embodiment, the CrCC coatings used are made using an Iridite™ process from MacDermid, Inc. having offices in Waterbury, Conn. (e.g., Iridite™ 14.2). In yet other embodiments, the CrCC include chromic acid anodized with chrome seal, sulfuric acid anodized with chrome seal, and the like. The age and thickness of the applied conversion coatings can further influence the corrosion resistance of the subsequent paint coatings. In one embodiment, the coating is applied over a conversion coating that is less than three days old, and is relatively moderate to heavy in thickness. Such a system is known to maintain good adhesion. Conversion coatings that are too thick for a given application tend to result in coatings with cohesive failure in the conversion coating layer. The proper conversion coating thickness will be readily apparent to one of ordinary skill in the art.

Methods

The invention further relates to processes for preparing and using the aforementioned coating compositions. Any conventional method for manufacturing a paint can be used. Examples of such methods include, but are not limited to, the use of drill presses powered by compressed air or electricity, sand mills that use appropriate grinding media, and the like. Such methods are known to those skilled in the art and will not be described in detail herein.

The mill base for a polyamide/epoxy-based water reducible primer formulation can be prepared (and, in fact, was prepared for all of the Examples described herein) by dispersing one or more binders, one or more pigments, solvent if needed, and a curing agent. The base for a self-priming topcoat composition, or enhanced self-priming topcoat composition can also be prepared in the same manner (and, in fact was prepared in this manner for all of the Examples described herein). In this process, the base is dispersed in an appropriately sized container at 650 rpm using a dispersion blade, such as a standard dispersion blade and standard dispersing equipment or even a drill press, as is known in the art. Next, under agitation at an appropriate speed, such as about 600-700 rpm, coloring pigments, naturally occurring extenders, that is, minerals such as gypsum, and synthetic extenders, together with any other corrosion inhibitors are incorporated into the coating formulation. If an appropriate grinding media is desired, it can be added as needed.

Next, once the material is properly added to the formulation, the base is allowed to disperse for a suitable time and speed, such as about five more minutes at 650 rpm. After this time, the dispersion speed can be increased as needed, such as to about 1600 to 1640 rpm until the desired mill base pigment grind is obtained. During dispersion at the higher speed, the temperature of the mill base can be monitored and kept below the recommended temperatures for the ingredients and resin systems used. If it appears that the mill base temperature is close to exceeding the recommended temperatures for the stability of the ingredients or resins, the dispersion speed can be reduced appropriately. If necessary, the dispersion process can be halted momentarily to allow proper cooling. As will be understood by those of skill in the art with reference to this disclosure, other steps, such as using cooling systems to minimize higher dispersion temperatures can additionally or alternatively be used. Also, as will be understood by those of skill in the art with reference to this disclosure, the solvent employed in the preparation of the coating system is chosen in such a manner as to facilitate the preparation of the coating mixture, to provide suitable application properties, and provide and environmentally acceptable paint.

Next, once the desired pigment particle size for the base grind is obtained, the dispersion process can be halted, and the base filtered, if desired, to remove any undesired material from the base, such as grinding media that can optionally have been used. Next, the balance of formula ingredients are then added in a "letdown phase", as it is known in the art, while the pigment base or mill base is mixed. An optional step is to allow the base or finished paint to set for at least twenty-four hours prior to use, which allows the resin to wet all of the pigments.

The shelf life of the polyamide/epoxy-based water reducible primer formulation or the self-priming topcoat composition, or the enhanced self-priming topcoat composition prior to use is generally dictated by the time specifications provided by the supplier of the resin system.

Next, the polyamide/epoxy-based water reducible primer formulation, self-priming topcoat composition, or the enhanced self-priming topcoat composition is prepared by stirring appropriate amounts of a catalyst or activator, such as an isocyanate catalyst, into the finished base described above. Examples of isocyanate catalysts for self-priming topcoat or enhanced self-priming topcoat formulations include an isocyanate solution known as Deft 97GY088CAT available from Deft Inc., having offices in Irvine, Calif. To ensure proper curing and cross-linking of the resulting paint film, the amount of isocyanate catalyst added to the finished paint base can vary depending on the particular components of the coating system, as will be understood by those of skill in the art with reference to this disclosure.

Next, for the self-priming topcoat composition, or the enhanced self-priming topcoat composition, once the finished base and catalyst have been mixed together, the coating is ready for application to a substrate. The substrate to be coated can be that of a fabricated article, such as aircraft, automobiles, trucks, and farm equipment, for example, further including the components and parts for these articles.

Next, for the polyamide/epoxy-based water reducible primer formulation, once the appropriate amounts of epoxy catalyst and mill base are well mixed together, the appropriate amount of water is then slowly mixed into the primer mill base/epoxy catalyst blend and testing can be performed. The purity and amount of water added depends on what is recommended by the supplier of the coating system based on the spray viscosity and final use of the coating. Since the paint formulation is a water reducible system, care needs to be taken when adding the aqueous component to the epoxy catalyst/mill base blend.

The medium employed in the preparation of the coating system of the present invention is typically chosen in such a manner as to facilitate the preparation of the coating mixture, and to provide suitable adhesion to the substrate. The preferred medium is water, which includes the preparation of water borne coatings. Other systems include solvent-based and powder coatings.

As noted above, once the mill base/epoxy blend and appropriate amount of water are mixed together, the primer is now ready for application to the substrate. Suitable substrates include metal substrates such as aluminum, aluminum alloys, cast aluminum, magnesium, magnesium alloys, titanium, zinc, galvanized zinc, zinc-coated steel, zinc alloys, zinc-iron alloys, zinc-aluminum alloys, steel, stainless steel, pickled steel, iron compounds, magnesium alloys, and the like. Preferred substrates for the practice of the present invention are aluminum and aluminum alloys. The substrate to be coated can be that of a fabricated article, as described above, further including the components and parts for these articles.

The coating mixtures of the invention can be applied to the surfaces of a metal substrate using any conventional technique, such as spraying, painting with a brush, painting with rollers, dipping, and the like, but they are most often applied by spraying. The usual spray techniques and equipment for air spraying and electrostatic spraying and either manual or automatic methods can be used. Preferred for the practice of the present invention is spray coating.

It is preferred that the surface, such as a metal surface, be prepared to receive the coating. This preparation includes the conventional method of first cleaning the surface to remove grease and other contaminants. Once the surface is free of surface contaminants, it can be treated to remove any oxide coating, and in certain instances to provide a conversion coating to which the corrosion-inhibiting mixture can more readily bond. In the event that the surface has a thick oxide coating, then this coating can be removed by conventional means, such as immersion in a series of sequential chemical baths containing concentrated acids and alkalis that remove such a surface coating.

In most embodiments, the substrate or coated substrate is prepared prior to receiving the coating, i.e., is pretreated. This preparation includes the conventional method of first cleaning the surface to remove grease and other contaminants. Once the surface is free of surface contaminants, it can be treated to remove any oxide coating by conventional means, such as by immersing the substrate in a series of sequential chemical baths containing concentrated acids and alkalis known to remove such a surface coating. As noted above, in some embodiments, the substrate is treated to provide a conversion coating to which the coating can more readily bond. Such a conversion coating can be prepared by any means known in the art, such as by immersion in concentrated chromic acid. When an aluminum substrate is used, for example, this process produces a controlled mixture of aluminum oxides on the surface of an aluminum or aluminum alloy substrate. Alternatively, the surface can be treated with a boric acid/sulfuric acid or any other anodizing process. This process produces a controlled mixture of aluminum oxides in the surface of an aluminum or aluminum alloy substrate. Optionally, after the surface has been treated to provide a conversion coating, the surface can be sealed by dipping the substrate into a dilute solution of chromic acid. The surface, whether sealed or unsealed, can then be coated with the coatings described herein.

In one embodiment, the coating is applied to an aluminum anodized substrate to create an aluminum anodized system with and without sealing in a chrome containing solution. In one embodiment, the coating is applied to an aluminum anodized substrate to create an aluminum anodized system with and without sealing in a rare earth solution. In one embodiment, the coating is applied to a steel substrate with and without sealing in the appropriate solution.

The coatings described herein can be applied to a substrate using any conventional technique, such as spraying, "painting" (e.g., with a brush, roller, and the like), dipping, and so forth. With regard to application via spraying, conventional (automatic or manual) spray techniques and equipment used for air spraying and electrostatic spraying can be used. In other embodiments, the coating is an electrolytic coating (e-coating) system, electrostatic (powder) coating, and the like. Various types of curing methods are described below.

The coatings described herein can be any suitable thickness, depending on the application requirements. In one embodiment, the coating is between about 1 to about 3 mils thick. In another embodiment, the coating is between about 0.8 to about 1.2 mils thick.

Typically, after application of the coating, the coating is cured using any suitable method. Typical curing methods include air drying, and/or heating and/or UV-curing methods. Other methods include, but are not limited to, microwave cured systems, ultrasonic cured systems, and the like. The method of curing will depend on the type of coating mixture employed, the surface to which it is applied, and so forth.

Once the coating is applied and cured, it can either receive subsequent topcoats, or be cured as a stand-alone coating. If the coating is to receive a subsequent topcoat, or several subsequent coatings, then the subsequent coating should be applied so as to be compatible with the coating layer already present, typically in accordance with the resin and/or topcoat manufacturers' specifications. If the coating does not receive any subsequent topcoats, it can then be allowed to cure.

In one embodiment, the coating is applied by pre-dispersing the carbon pigment with a dispersant as is known in the art. However, in the present invention, the pre-dispersing step is to improve corrosion resistance in addition to improving coverage properties. It is thought that by pre-dispersing the carbon pigments (and/or other corrosion inhibitors added to the polymeric material) better separation of the pigments is obtained.

Additional Embodiments

In one embodiment, the coating composition is a self-priming topcoat composition, or an enhanced self-priming topcoat composition. These coating compositions can be used on metals such as aluminum, aluminum alloys, cast aluminum, magnesium, magnesium alloys, titanium, zinc, zinc-coated steel, zinc alloys, zinc-iron alloys, zinc-aluminum alloys, bare and galvanized steel, stainless steel, pickled steel, iron compounds, magnesium alloys, substrates having metal pretreatments, such as chrome-based conversion coatings, anodized coatings, cobalt-based conversion coatings, phosphate-based conversion coatings, silica-based conversion coatings, rare earth-based conversion coatings, and stainless metal pretreatments for example, and polymers, polymer/metal composites, composites, coated substrates, and the like.

In a preferred but not required embodiment, the self-priming topcoat composition, or the enhanced self-priming topcoat composition is applied over a conversion coating that is less than three days old. Applying the self-priming topcoat composition, or the enhanced self-priming topcoat composition over a conversion coating has been found to maintain good adhesion of the coating to the substrate. It has also been found that conversion coatings that are too thick for a given application can result in cohesive failure in the conversion coating layer. As will be understood by those of skill in the art with reference to this disclosure, the proper conversion coating performance and thickness, for a particular coating composition, will be apparent and preferred coatings comply with MIL-C-5541.

In another embodiment, a process for preparing and using the self-priming topcoat composition, or the enhanced self-priming topcoat composition is provided. According to this embodiment, conventional methods for manufacturing a paint can be used. As will be understood by those of skill in the art with reference to this disclosure, examples of such methods include, but are not limited to, the use of drill presses powered by compressed air or electricity, sand mills that use appropriate grinding media, and the like.

Table 1 below provides a list of possible concentration ranges of corrosion-inhibiting carbon pigments and other components as are noted in the table and useful in the present invention. With regard to tested combinations, Examples 1-6 provide data on many of the tested compositions that were sprayed onto the specified substrates in accordance with manufacturer instructions for the base paint formulation. As the results show (See primarily Example 4), improved corrosion resistance was obtained with the coatings described herein, with some systems showing good or excellent corrosion resistance.

TABLE 1

Exemplary Corrosion-Inhibiting Carbon Pigments and Approximate Ranges***

Corrosion-Inhibiting Carbon Pigments:
Crystalline Corrosion-Inhibiting Carbon Pigments:

| | | |
|---|---|---|
| Graphite: | Range: 0.1-100 wt % | Preferred: 3-25 wt % |
| Raven ® 5000 UII Spheres: | Range: 0.1-100 wt % | Preferred: 3-25 wt % |

Amorphous Corrosion-Inhibiting Carbon Pigments:

| | | |
|---|---|---|
| Conductive Carbons: | Range: 0.1-100 wt % | Preferred: 3-25 wt % |
| Non-Conductive Carbons: | Range: 0.1-100 wt % | Preferred: 3-25 wt % |
| Activated Carbons: | Range: 0.1-100 wt % | Preferred: 3-25 wt % |
| Generic Carbon Pigment: | Range: 0.1-100 wt % | Preferred: 3-25 wt % |

Surface-Modified Corrosion-Inhibiting Carbon Pigments:

| | | |
|---|---|---|
| Raven ® 1040: | Range: 0.1-100 wt % | Preferred: 3-25 wt % |
| Raven ® 1250: | Range: 0.1-100 wt % | Preferred: 3-25 wt % |
| Raven ® 1255: | Range: 0.1-100 wt % | Preferred: 3-25 wt % |

Resin and/or Surfactant Dispersed Corrosion-Inhibiting Carbon Pigments:

| | | |
|---|---|---|
| 1/7 Sun Chemical-PLD-2070: | Range: 0.1-100 wt % | Preferred: 3-25 wt % |
| LHD-9303: | Range: 0.1-100 wt % | Preferred: 3-25 wt % |
| U47-2355: | Range: 0.1-100 wt % | Preferred: 3-25 wt % |

Carbon and Carbon Blends:

| | | |
|---|---|---|
| Bone Black: | Range: 0.1-100 wt % | Preferred: 3-25 wt % |

Combinations of any of the Above:

| | | |
|---|---|---|
| Combinations: | Range: 0.1-100 wt % | Preferred: 3-25 wt % |

Neutral to Slightly Acidic Generating Extenders and Acidic Generating Extenders
Metal Sulfates:

| | | |
|---|---|---|
| $CaSO_4 \cdot 2H_2O$: | Range: 1-<100 wt % | Preferred: 45-75 wt % |
| $SrSO_4$: | Range: 1-<100 wt % | Preferred: 45-75 wt % |
| $CaSO_4$ Anhyd.: | Range: 1-<100 wt % | Preferred: 45-75 wt % |
| $BaSO_4 \cdot 2H_2O$: | Range: 1-<100 wt % | Preferred: 45-75 wt % |
| $MgSO_4 \cdot 2H_2O$ | Range: 0.1-<3 wt % | Preferred: 1.5-2.5 wt % |
| $(La)_2(SO_4)_3 \cdot 2H_2O$: | Range: 1-<100 wt % | Preferred: 45-75 wt % |
| $Li_2SO_4 \cdot 2H_2O$: | Range: 1-<100 wt % | Preferred: 45-75 wt % |

Metal Phosphates:

| | | |
|---|---|---|
| $Ca(H_2PO_4)_2 \cdot H_2O$: | Range: 1-<100 wt % | Preferred: 45-75 wt % |
| $Ca(HPO_4) \cdot H_2O$: | Range: 1-<100 wt % | Preferred: 45-75 wt % |
| $Ca_3(PO_4)_2 \cdot H_2O$: | Range: 1-<100 wt % | Preferred: 45-75 wt % |

Other Extender Types:

| | | |
|---|---|---|
| $CaCO_3 \cdot 2H_2O$ | Range: 3-100 wt % | Preferred: 45-75 wt % |
| Kaolin: | Range: 3-100 wt % | Preferred: 45-75 wt % |

Rare Earth Compounds:
Rare Earth Oxides, Hydrated Oxides, and Mixed Oxides:

| | | |
|---|---|---|
| $Pr_6O_{11}$: | Range: 0.1-<100 wt % | Preferred: 0.4-26 wt % |
| $Pr_2O_3$: | Range: 0.1-<100 wt % | Preferred: 0.4-26 wt % |
| $PrO_2$: | Range: 0.1-<100 wt % | Preferred: 0.4-26 wt % |
| $PrO_2 + Pr_2O_3$: | Range: 0.1-<100 wt % | Preferred: 0.4-26 wt % |
| $Tb_3O_7$: | Range: 0.1-<100 wt % | Preferred: 0.4-26 wt % |
| $CeO_2$ Hydrous | Range: 0.1-<100 wt % | Preferred: 0.4-26 wt % |
| $Pr(OH)_3$: | Range: 0.1-<100 wt % | Preferred: 0.4-26 wt % |
| $Sm_2O_3$: | Range: 0.1-<100 wt % | Preferred: 0.4-26 wt % |
| $Yb_2O_3$: | Range: 0.1-<100 wt % | Preferred: 0.4-26 wt % |
| $Y_2O_3$: | Range: 0.1-<100 wt % | Preferred: 0.4-26 wt % |

TABLE 1-continued

Exemplary Corrosion-Inhibiting Carbon Pigments and Approximate Ranges***

| | | |
|---|---|---|
| La$_2$O$_3$: | Range: 0.1-<100 wt % | Preferred: 0.4-26 wt % |
| Nd$_2$O$_3$: | Range: 0.1-<100 wt % | Preferred: 0.4-26 wt % |
| Rare Earth Salts and Acid Complexes Additives: | | |
| Pr Sulfate: | Range: 0.1-5 wt % | Preferred: 0.5-2.5 wt % |
| Sm Acetate: | Range: 0.1-5 wt % | Preferred: 0.5-2.5 wt % |
| Pr Carbonate: | Range: 0.5-5 wt % | Preferred: 2.0-3 wt % |
| Pr Triflate: | Range: 0.4-5 wt % | Preferred: 0.7-3 wt % |
| Ce Triflate: | Range: 0.4-5 wt % | Preferred: 0.7-3 wt % |
| Amino Acids and Amino Acid Derivatives as Pigments and/or Additives: | | |
| L Arginine: | Range: 0.1-5 wt % | Preferred: 0.5-1.5 wt % |
| DL Arginine: | Range: 0.1-5 wt % | Preferred: 0.5-1.5 wt % |
| D Methionine: | Range: 0.1-5 wt % | Preferred: 0.5-1.5 wt % |
| L Methionine: | Range: 0.1-5 wt % | Preferred: 0.5-1.5 wt % |
| DL Methionine: | Range: 0.1-5 wt % | Preferred: 0.5-1.5 wt % |
| Glycine: | Range: 0.1-5 wt % | Preferred: 0.5-1.5 wt % |
| L-Cystiene: | Range: 0.1-5 wt % | Preferred: 0.5-1.5 wt % |
| Cystene: | Range: 0.1-5 wt % | Preferred: 0.5-1.5 wt % |
| Proline: | Range: 0.1-5 wt % | Preferred: 0.5-1.5 wt % |
| Ethylenediaminetetraacetic acid (Free): | Range: 0.1-5 wt % | Preferred: 0.5-1.5 wt % |
| Ethylenediaminetetraacetic acid (Disodium salt): | Range: 0.1-5 wt % | Preferred: 0.5-1.5 wt % |
| DL Methionine Sulfoxide: | Range: 0.1-5 wt % | Preferred: 0.5-1.5 wt % |
| L-Methionine methylsulfonium iodide: | Range: 0.1-5 wt % | Preferred: 0.5-1.5 wt % |
| Rare Earth Complexes using Amine-Based Organics: | | |
| Ethylenediaminetetraacetic acid (Disodium salt) + Rare Earth Salt/Cation: | Range: 0.1-5 wt % | Preferred: 0.5-1.5 wt % |
| Gelatins and Gelatin Derivatives as Pigment or Additives: | | |
| Animal Gelatin: | Range: 0.03-5 wt % | Preferred: 0.1-1.2 wt % |
| Proline of Fish Gelatin: | Range: 0.03-5 wt % | Preferred: 0.1-1.2 wt % |
| Linear and Cyclic Dextrins as Pigment or Additives: | | |
| Alpha or Beta Cyclodextrins: | Range: 0.03-5 wt % | Preferred: 0.1-1.2 wt % |
| Sulfonated Cyclodextrins: | Range: 0.03-5 wt % | Preferred: 0.1-1.2 wt % |
| Organic-Based Ion Exchange Resins | | |
| Organic-Based Ion Exchange Resins: | | |
| *Reillex ™: | Range: 0.1-7 wt % | Preferred: 0.5-3 wt % |
| *Whatman ® CM23: | Range: 0.1-7 wt % | Preferred: 0.5-3 wt % |
| Whatman ® P11: | Range: 0.1-7 wt % | Preferred: 0.5-3 wt % |
| Whatman ® DE23: | Range: 0.1-7 wt % | Preferred: 0.5-3 wt % |
| Pre-Exchanged Organic-Based Ion Exchange Resins and Rare Earth Complexes: | | |
| Whatman ® CM23 Pre-Exchanged with Praseodymium Triflate: | Range: 0.1-7 wt % | Preferred: 0.5-3 wt % |
| Whatman ® CM23 Pre-Exchanged with Methionine: | Range: 0.1-7 wt % | Preferred: 0.5-3 wt % |
| Whatman ® CM23 Pre-Exchanged with Praseodymium Salt such as a Nitrate Salt: | Range: 0.1-7 wt % | Preferred - 0.5-3 wt % |
| Whatman ® CM23 Pre-Exchanged with Cerium Salt such as a Nitrate Salt: | Range: 0.1-7 wt % | Preferred - 0.5-3 wt % |
| Whatman ® CM23 Pre-Exchanged with Sulfuric Acid: | Range: 0.1-7 wt % | Preferred - 0.5-3 wt % |
| Triflate Additives: | | |
| Triflic Acid[d]: | Range: 0.1-0.5 wt % | Preferred: 0.2-0.3 wt % |
| Pr Triflate: | Range: 0.4-5 wt % | Preferred: 0.7-3 wt % |
| Ce Triflate: | Range: 0.4-5 wt % | Preferred: 0.7-3 wt % |

[d]Additive concentrations are expressed as a weight percent based a fully catalyzed and or reduced sprayable paint.
*made by Reilly Industries Inc., having offices in Clayton, Wisconsin.
**made by Whatman Inc., having offices in Clifton, New Jersey.
***Ranges given as: "Range: x-x wt %"are understood to read as: "Range: between about x to about x wt %"

The invention will be further described by reference to the following non-limiting examples, which are offered to further illustrate various embodiments of the present invention. It should be understood, however, that many variations and modifications can be made while remaining within the scope of the present invention.

EXAMPLE 1

Exemplary Mill Base Formulation

A polyamide/epoxy water reducible primer mill base formulation containing a carbon pigment was prepared. One example formulation is shown below in Table 2. Other formulations were also tested:

TABLE 2

Primer Mill Base Formulation

| Component: | |
|---|---|
| Polyamide Resin Blend | 397 g |
| Dispersing Agent | 6 g |
| 2-Butanol Solvent | 83 g |
| Carbon or carbon blends | 514 g |
| Mill Base Total: | 1000 g |

Description of Exemplary Primer Preparation

A polyamide/epoxy water reducible primer prepared from such a mill base formulation further includes an epoxy catalyst and water, i.e., a three-part formulation. An exemplary polyamide/epoxy water reducible primer was prepared by adequately stirring appropriate amounts of an epoxy catalyst into the mill base described above. One example of an epoxy catalyst for polyamide/epoxy water reducible primer formulations that was tested is an epoxy/nitroethane solution "44WO16CAT" available from Deft Inc. The amount of epoxy catalyst to mill base depends on the amount recommended by the supplier of this coating system to ensure proper curing and cross-linking of the resulting primer paint film.

Once the appropriate amounts of epoxy catalyst and mill base were well mixed together, the appropriate amount of water was then slowly mixed into the primer mill base/epoxy catalyst blend, to give a viscosity suitable for a given application procedure. The purity and amount of the water added depended on supplier recommendations, spray viscosity, and intended coating use. Since the paint formulation was a water reducible system, care needed to be taken when adding the aqueous component to the epoxy catalyst/mill base blend.

The solvent employed in the preparation of the coating system of the present invention was chosen in such a manner as to facilitate the preparation of the coating mixture, and to provide suitable adhesion to the substrate. In most experiments, water was used as the solvent.

Once the mill base/epoxy blend and appropriate amount of water were mixed together, the primer was ready for application to the substrate, with test results discussed in Example 4.

EXAMPLE 2

Exemplary Mill Base Formulation and Tested Compositions

Various carbon pigments were combined with one or more of the following, acidic or neutral extender, basic extender, metal phosphate, rare earth compounds, amino acids and amino acid derivatives, gelatin and gelatin derivatives, linear and cyclic dextrins, organic-based exchange resins, and combinations thereof, further optionally including coloring pigments in a polyamide/epoxy water reducible primer mill base formulation. One example formulation is shown below in Table 3. Other formulations were also tested:

TABLE 3

Primer Mill Base Formulation

| Component | mass (g) |
|---|---|
| Polyamide Resin Blend | 332 |
| Dispersing Agent | 5 |
| 2-Butanol Solvent | 69 |
| Extender | 384 |
| Carbon or Carbon Blends | 48 |
| Corrosion Inhibitor* | 162 |
| Mill Base Total: | 1000 |

*Refers to rare earth compounds, amino acids and amino acid derivatives, gelatin and gelatin derivatives, organic-based exchange resins, and or combinations of the like.

Tested primers were prepared as described above in Example 1.

Table 4 provides a summary of the various compositions tested and their preferred wt % range.

TABLE 4

Tested Compositions

| Components | Range (wt %)* | Preferred Range (wt %)* |
|---|---|---|
| Carbon pigments | 0.1-100 | 3-25 |
| Extender Pigments | 1-100 | 45-75 |
| Metal Sulfates Additives | 0.1-3 | 1.5-2.5 |
| Rare Earth Oxides/Mixed Oxides/Hydrated Oxides | 0.1-100 | 0.4-26 |
| Rare Earth Salts And Acid Complexes Additives | 0.1-5 | 0.5-2.5 |
| Amino Acids and Derivatives of Amino Acids as Pigments and or Additives | 0.1-5 | 0.5-1.5 |
| Rare Earth Complexes using Amine-based Organics | 0.1-5 | 0.5-1.5 |
| Gelatins and Gelatin Derivatives as Pigments and or Additives | 0.03-5 | 0.1-1.2 |
| Linear and Cyclic Dextrins as Pigments and or Additives | 0.03-5 | 0.1-1.2 |
| Ion Exchange Resins (Not Pre-Exchanged) | 0.1-7 | 0.5-3 |
| Ion Exchange Resins and Rare Earth Complexes | 0.1-7 | 0.5-3 |
| Triflate Additives$^d$ | 0.1-0.5 | 0.2-0.3 |

$^d$Additive concentrations are expressed as a weight percent based on a fully catalyzed and or reduced sprayable paint.
*Ranges given as: "x-x" are understood to read as: "Range: between about x to about x"

EXAMPLE 3

Exemplary Mill Base Formulation

Various carbon pigments were combined with an acidic or neutral extender or a basic extender and/or a metal phosphate and/or amino acids and amino acid derivatives and/or gelatin and gelatin derivatives and/or organic-based exchange resins in a polyamide/epoxy water reducible primer mill base formulation. Some formulations include other additives, such as colorants (e.g. titanium dioxide). One example formulation is shown below in Table 5. Other formulations were also tested:

TABLE 5

Primer Mill Base Formulation

| Component | mass (g) |
|---|---|
| Polyamide Resin Blend | 332 |
| Dispersing Agent | 5 |
| 2-Butanol Solvent | 69 |
| Extender | 384 |
| Carbon Compound | 48 |
| Additional Corrosion Inhibitor* | 162 g |
| Mill Base Total: | 1000 |

*Refers to rare earth compounds, amino acids and amino acid derivatives, gelatin and gelatin derivatives, organic-based exchange resins, and or combinations of the like.

Tested primers were prepared as described above in Example 1.

Refer to Table 4 in Example 2 for a summary of the various compositions tested and their preferred wt % range.

EXAMPLE 4

Test Results on Exemplary Coatings

Many of the formulations noted in the previous examples were tested on various substrates for corrosion resistance. The Corrosion Rating Scale used is shown in Table 6. Examples of primer formulations that were prepared and evaluated are provided in Tables 7-9.

Starting Materials

The Deft SrCr Primer (44GN072) was obtained from Deft Inc. having offices in Irvine, California. As noted above, the Raven materials and the Ultra II materials, were obtained from Columbian Chemicals Company having offices in Marietta, Ga. The LHD, U47 and PLD materials were obtained from Sun Chemical having offices in Cincinnati, Ohio. $Pr_6O_{11}$ was obtained from either Molycorp, Inc. having offices in Mountain Pass, Calif. or from Alfa Aesar Co. having offices in Ward Hill, Ma. Conductive carbon, non-conductive carbon, and activated carbon were obtained from Alpha Aesar having offices in Ward Hill, Ma. Bone black was obtained from the Ebonex Corporation, having offices in Melvindale, Mich. Jet black was obtained from Elementis Pigments, Inc., having offices in Fairview Heights, Ill. $CaSO_4 \cdot 2H_2O$ was obtained from US Gypsum from Chicago, Ill. $SrSO_4$ was obtained from Excalibar of Houston, Tex.

Test Procedure

The coating was sprayed onto different metal substrates and allowed to dry (cure) naturally over time. Typically this took about one week. Edges and backs of samples were taped and front surfaces were scribed with an "X" pattern according to ASTM B117 procedure. Tests were run according to ASTM B117 procedure for either 500 or 3000 hours and the results evaluated according to the Keller Corrosion Rating Scale shown in Table 7.

TABLE 6

Keller Corrosion Rating Scale (Boeing-St. Louis), i.e., 3000 and 500 Hours Salt Fog Ratings Employed in Table 8.

| Code | Scribe line ratings description |
|---|---|
| 1. | Scribe line beginning to darken or shiny scribe |
| 2. | Scribe lines >50% darkened |
| 3. | Scribe line dark |
| 4. | Several localized sites of white salt in scribe lines |
| 5. | Many localized sites of white salt in scribe lines |
| 6. | White salt filling scribe lines |
| 7. | Dark corrosion sites in scribe lines |
| 8. | Few blisters under primer along scribe line. (<12) |
| 9. | Many blisters under primer along scribe line |
| 10. | Slight lift along scribe lines |
| 11. | Coating curling up along scribe |
| 12. | Pin point sites/pits of corrosion on organic coating surface (1/16 to 1/8 in diameter - about 0.16 cm (0.06 in) to about 0.32 cm (0.13 in) |
| 13. | One or more blisters on surface away from scribe |
| 14. | Many blisters under primer away from scribe |
| 15. | Starting to blister over surface |

Scribe Line Activity (corrosion creepage beyond scribe)

| | |
|---|---|
| A. | No creepage |
| B. | 0 to 1 1/64 in - about 0 cm (in) to about 0.04 cm (0.02 in) |
| C. | 1/64 to 1/32 in - about 0.04 cm (0.02 in) to about 0.08 cm (0.03 in) |
| D. | 1/32 to 1/16 in - about 0.08 cm (0.03 in) to about 0.16 cm (0.06 in) |
| E. | 1/16 to 1/8 in - about 0.16 cm (0.06 in) to about 0.32 cm (0.13 in) |
| F. | 3/16 to 1/4 in - about 0.2 cm (0.48 in) to about 0.5 cm (0.25 in) |
| G. | 1/4 to 3/8 in - about 0.6 cm (0.25 in) to about 0.95 cm (0.38 in) |

TABLE 7

Primers Prepared and Evaluated:

| Panel Number | Corrosion Inhibitor | Weight Percent* Inhibitor Concentration | Extender/activator | 3000 HRS Salt Fog Rating |
|---|---|---|---|---|
| 4 | Commercial SrCr Primer (Deft 44GN072) (Control) | Proprietary | Proprietary | 2,8 A |
| 415 | Raven 1040 | 8.3 | 67.7 $CaSO_4 \cdot 2H_2O$ | 3,4 A |
| 392 | Raven 1040 | 8.6 | 73.8 $SrSO_4$ | 2,4 A |
| 380 | Raven 1040 + $Pr_6O_{11}$ | 7.7/24 | 57 $CaSO_4 \cdot 2H_2O$ | 3,4 A |
| 384 | PLD-2070 + $Pr_6O_{11}$ | 15/22.1 | 52.5 $CaSO_4 \cdot 2H_2O$ | 3,4 A |
| 385 | LHD-9303 + $Pr_6O_{11}$ | 15.9/21.9 | 51.9 $CaSO_4 \cdot 2H_2O$ | 2,5 A |
| 383 | U47-2355 + $Pr_6O_{11}$ | 14.1/22.4 | 53 $CaSO_4 \cdot 2H_2O$ | 2,5 A |
| 411 | Conductive Carbon | 19.8 | 59.1 $CaSO_4 \cdot 2H_2O$ | 3,5 A |
| 388 | Cond. Carbon + $Pr_6O_{11}$ | 18.8/21.1 | 50.0 $CaSO_4 \cdot 2H_2O$ | NR |
| 412 | Non-Conductive Carbon | 8.1 | 67.8 $CaSO_4 \cdot 2H_2O$ | NR |
| 389 | Non-Cond. Carb + $Pr_6O_{11}$ | 7.6/24.0 | 57 $CaSO_4 \cdot 2H_2O$ | 1,4 A |

TABLE 7-continued

Primers Prepared and Evaluated:

| Panel Number | Corrosion Inhibitor | Weight Percent* Inhibitor Concentration | Extender/activator | 3000 HRS Salt Fog Rating |
|---|---|---|---|---|
| 413 | Activated Carbon | 7.2 | 68.5 $CaSO_4 \cdot 2H_2O$ | 1,4 A |
| 390 | Act. Carbon + $Pr_6O_{11}$ | 6.8/24.3 | 57.4 $CaSO_4 \cdot 2H_2O$ | 2,5 A |
| 199 | | | 15.6% $CaSO_4 \cdot 2H_2O$ | 2 A |
| 398 | $Pr_6O_{11}$ | 26 | 61.7 $CaSO_4 \cdot 2H_2O$ | 1,5 A |
| 414 | Primers 398/415 | | | 3,6 A$^a$ |
| 403 | Primers 402/380 | | | 3,6 A$^a$ |

*= Weight percent inhibitor pigment based on weight percent of total pigments used.
Coating consisting of one primer applied over the other.

TABLE 8

Primers Prepared And Evaluated

| Panel Number | Corrosion Inhibitor | Weight Percent* Inhibitor Concentration | Extender/activator | 500 HRS Salt Fog Rating |
|---|---|---|---|---|
| 460-1 | | | 100 $CaSO_4 \cdot 2H_2O$ | 2,4 A |
| 461-1 | $Pr_6O_{11}$ | 30 | 70 $CaSO_4 \cdot 2H_2O$ | 1+ A |
| 462-1 | Conductive Carbon | 9 | 91 $CaSO_4 \cdot 2H_2O$ | 1+ A |
| 463-1 | Cond. Carbon + $Pr_6O_{11}$ | 8/27 | 65 $CaSO_4 \cdot 2H_2O$ | 1+ A |
| 464-1 | Non-Conductive Carbon | 9 | 91 $CaSO_4 \cdot 2H_2O$ | 1+ A |
| 465-1 | Non-Cond. Carbon + $Pr_6O_{11}$ | 8/27 | 65 $CaSO_4 \cdot 2H_2O$ | 1+ A |
| 466-1 | Activated Carbon | 9 | 91 $CaSO_4 \cdot 2H_2O$ | 1+ A |
| 467-1 | Act. Carbon + $Pr_6O_{11}$ | 8/27 | 65 $CaSO_4 \cdot 2H_2O$ | 1+ A |
| 468-1 | PLD-2070 | 9 | 91 $CaSO_4 \cdot 2H_2O$ | 1 A |
| 469-1 | PLD-2070 + $Pr_6O_{11}$ | 8/27 | 65 $CaSO_4 \cdot 2H_2O$ | 1+ A |
| 470-1 | LHD-9303 | 9 | 91 $CaSO_4 \cdot 2H_2O$ | 1+ A |
| 471-1 | LHD-9303 + $Pr_6O_{11}$ | 8/27 | 65 $CaSO_4 \cdot 2H_2O$ | 1 A |
| 472-1 | U47-2355 | 10 | 90 $CaSO_4 \cdot 2H_2O$ | 1 A |
| 473-1 | U47-2355 + $Pr_6O_{11}$ | 9/27 | 64 $CaSO_4 \cdot 2H_2O$ | 1 A |
| 474-1 | Raven 1040 | 9 | 91 $CaSO_4 \cdot 2H_2O$ | 1+ A |
| 475-1 | Raven 1040 + $Pr_6O_{11}$ | 8/27 | 65 $CaSO_4 \cdot 2H_2O$ | 1+ A |
| 476-1 | Ultra II 5000 | 9 | 91 $CaSO_4 \cdot 2H_2O$ | No Reading |
| 477-1 | Ultra II 5000 + $Pr_6O_{11}$ | 8/27 | 65 $CaSO_4 \cdot 2H_2O$ | No Reading |
| 478-1 | Raven 1250 | 9 | 91 $CaSO_4 \cdot 2H_2O$ | 1+ A |
| 479-1 | Raven 1250 + $Pr_6O_{11}$ | 8/27 | 65 $CaSO_4 \cdot 2H_2O$ | 1+ A |
| 480-1 | Raven 1255 | 9 | 91 $CaSO_4 \cdot 2H_2O$ | 1+ A |
| 481-1 | Raven 1255 + $Pr_6O_{11}$ | 8/27 | 65 $CaSO_4 \cdot 2H_2O$ | 3 A |
| 482-1 | Bone Black | 9 | 91 $CaSO_4 \cdot 2H_2O$ | 1+ A |
| 483-1 | Bone Black + Raven 1040 | 9/4 | 87 $CaSO_4 \cdot 2H_2O$ | 1+ A |
| 484-1 | Bone Black + Raven 1040 + $Pr_6O_{11}$ | 8/4/26 | 62 $CaSO_4 \cdot 2H_2O$ | 1+ A |
| 485-1 | Raven 1040 | 9 | 52 $CaSO_4 \cdot 2H_2O$ 39 $SrSO_4$ | 1+ A |
| 486-1 | Raven 1040 + $Pr_6O_{11}$ | 7/22 | 41 $CaSO_4 \cdot 2H_2O$ 31 $SrSO_4$ | 1+ A |
| 487-1 | | | 100 $SrSO_4$ | 1+ A |
| 488-1 | Raven 1040 | 8 | 93 $SrSO_4$ | No Reading |
| 489-1 | Raven 1040 + $Pr_6O_{11}$ | 6/19 | 75 $SrSO_4$ | No Reading |
| 490-1 | Jet Black | 9 | 91 $CaSO_4 \cdot 2H_2O$ | 1+ A |
| 491-1 | Jet Black + $Pr_6O_{11}$ | 8/27 | 65 $CaSO_4 \cdot 2H_2O$ | No Reading |

*= Weight percent inhibitor pigment based on weight percent of total pigments used.
+ = Scribed area of the panel has no signs of significant corrosion with visual inspection.

TABLE 9

Primers Plus Topcoat Prepared And Evaluated

| Panel Number | Corrosion Inhibitor | Weight Percent* Inhibitor Concentration | Extender/activator | 500 HRS Salt Fog Rating |
|---|---|---|---|---|
| 460-2 | | | 100 $CaSO_4 \cdot 2H_2O$ | 2 A |
| 461-2 | $Pr_6O_{11}$ | 30 | 70 $CaSO_4 \cdot 2H_2O$ | 2 A |
| 462-2 | Conductive Carbon | 9 | 91 $CaSO_4 \cdot 2H_2O$ | 1+ A |
| 463-2 | Cond. Carbon + $Pr_6O_{11}$ | 8/27 | 65 $CaSO_4 \cdot 2H_2O$ | 1+ A |
| 464-2 | Non-Conductive Carbon | 9 | 91 $CaSO_4 \cdot 2H_2O$ | 1+ A |
| 465-2 | Non-Cond. Carbon + $Pr_6O_{11}$ | 8/27 | 65 $CaSO_4 \cdot 2H_2O$ | 1+ A |
| 466-2 | Activated Carbon | 9 | 91 $CaSO_4 \cdot 2H_2O$ | 1+ A |
| 467-2 | Act. Carbon + $Pr_6O_{11}$ | 8/27 | 65 $CaSO_4 \cdot 2H_2O$ | 1+ A |
| 468-2 | PLD-2070 | 9 | 91 $CaSO_4 \cdot 2H_2O$ | 1+ A |
| 469-2 | PLD-2070 + $Pr_6O_{11}$ | 8/27 | 65 $CaSO_4 \cdot 2H_2O$ | 1+ A |
| 470-2 | LHD-9303 | 9 | 91 $CaSO_4 \cdot 2H_2O$ | 1+ A |
| 471-2 | LHD-9303 + $Pr_6O_{11}$ | 8/27 | 65 $CaSO_4 \cdot 2H_2O$ | 1+ A |
| 472-2 | U47-2355 | 10 | 90 $CaSO_4 \cdot 2H_2O$ | 1+ A |
| 473-2 | U47-2355 + $Pr_6O_{11}$ | 9/27 | 64 $CaSO_4 \cdot 2H_2O$ | 3, 4 A |
| 474-2 | Raven 1040 | 9 | 91 $CaSO_4 \cdot 2H_2O$ | 2 A |
| 475-2 | Raven 1040 + $Pr_6O_{11}$ | 8/27 | 65 $CaSO_4 \cdot 2H_2O$ | 1+ A |
| 476-2 | Ultra II 5000 | 9 | 91 $CaSO_4 \cdot 2H_2O$ | No reading |
| 477-2 | Ultra II 5000 + $Pr_6O_{11}$ | 8/27 | 65 $CaSO_4 \cdot 2H_2O$ | No Reading |
| 478-2 | Raven 1250 | 9 | 91 $CaSO_4 \cdot 2H_2O$ | 1+ A |
| 479-2 | Raven 1250 + $Pr_6O_{11}$ | 8/27 | 65 $CaSO_4 \cdot 2H_2O$ | 1+ A |
| 480-2 | Raven 1255 | 9 | 91 $CaSO_4 \cdot 2H_2O$ | 1+ A |
| 481-2 | Raven 1255 + $Pr_6O_{11}$ | 8/27 | 65 $CaSO_4 \cdot 2H_2O$ | 1+ A |
| 482-2 | Bone Black | 9 | 91 $CaSO_4 \cdot 2H_2O$ | 1+ A |
| 483-2 | Bone Black + Raven 1040 | 9/4 | 87 $CaSO_4 \cdot 2H_2O$ | 1+ A |
| 484-2 | Bone Black + Raven 1040 + $Pr_6O_{11}$ | 8/4/26 | 62 $CaSO_4 \cdot 2H_2O$ | 1+ A |
| 485-2 | Raven 1040 | 9 | 52 $CaSO_4 \cdot 2H_2O$ 39 $SrSO_4$ | 1+ A |
| 486-2 | Raven 1040 + $Pr_6O_{11}$ | 7/22 | 41 $CaSO_4 \cdot 2H_2O$ 31 $SrSO_4$ | 1+ A |
| 487-2 | | | 100 $SrSO_4$ | 1+ A |
| 488-2 | Raven 1040 | 8 | 93 $SrSO_4$ | 1+ A |
| 489-2 | Raven 1040 + $Pr_6O_{11}$ | 6/19 | 75 $SrSO_4$ | 1+ A |
| 490-2 | Jet Black | 9 | 91 $CaSO_4 \cdot 2H_2O$ | 1+ A |
| 491-2 | Jet Black + $Pr_6O_{11}$ | 8/27 | 65 $CaSO_4 \cdot 2H_2O$ | 1+ A |

Defthane ® ELF ™ 99GY001 Flat fluorinated Deft APC Topcoat.
*= Weight percent inhibitor pigment based on weight percent of total pigments used.
+ = Scribed area of the panel has no signs of significant corrosion with visual inspection.

The minimum acceptable corrosion resistance varies with the application. However, as noted above, good corrosion resistance is considered to be a reading of "2", "4" and "A," with excellent corrosion resistance being at least "1" and "A." As the above results show, many of the corrosion-inhibiting carbon pigment-containing coatings performed very well in these tests.

EXAMPLE 5

Exemplary Self-priming Topcoat Base Formulation

Self-priming topcoat base formulations comprising one or more Group I A or Group II A, and/or yttrium, and/or lanthanide compounds, such as metal sulfates, metal phosphates, metal nitrates, and/or metal silicates and the like; and optionally one or more co-inhibitors such as, rare earth compounds, metal oxides, borates, metaborates, silicates, phosphates, phosphonates, aniline, polyaniline, and the like, were prepared. An exemplary formulation is shown below in Table 10. Other formulations were also prepared and tested.

TABLE 10

Self-priming Topcoat Base Formulation

| Component | mass (g) |
|---|---|
| Polyester Resin Blend (binder) | 307 |
| Dispersing Agent | 2 |
| Ketone and Ester Solvent | 123 |
| Additives | 7 |
| Color Pigments | 265 |
| Neutral to Acidic Extenders and/or Corrosion Inhibitive Pigments | 296 |
| Base Total: | 1000 |

EXAMPLE 6

Enhanced Self-priming Topcoat Base Formulation

Enhanced self-priming topcoat base formulations comprising one or more Group I A or Group II A, and/or yttrium, and/or lanthanide compounds, such as metal sulfates, metal phosphates, metal nitrates, and/or metal silicates and the like;

and optionally one or more co-inhibitors such as, rare earth compounds, metal oxides, borates, metaborates, silicates, phosphates, phosphonates, aniline, polyaniline, and the like, were prepared. An exemplary formulation is shown below in Table 11.

TABLE 11

Enhanced Self-Priming Topcoat Base Formulation

| Component | mass (g) |
|---|---|
| Polyester Resin Blend (binder) | 130 |
| Fluorinated Resin Blend (binder) | 240 |
| Dispersing Agent | 6 |
| Ketone Solvent | 77 |
| VOC Exempt Solvents | 5 |
| Color Pigments | 45 |
| Corrosion Inhibitive Pigments | 310 |
| Extender Pigments | 74 |
| Base Total: | 1000 |

According to the present invention, direct to metal coatings and enhanced direct to metal coatings were prepared with the base formulations described herein. The coating compositions also included an isocyanate catalyst, that is, a two-part formulation, such as isocyanate solution 97GY088CAT, available from Deft Inc., having offices in Irvine, Calif. The direct to metal coatings and enhanced direct to metal coatings, shown herein by way of example, were prepared by adequately stirring appropriate amounts of isocyanate catalyst into the base formulations described above. The amount of isocyanate catalyst included in the coating compositions was added according to the amount recommended by the supplier to ensure proper curing and cross-linking of the resulting coating. The solvent employed in the preparation of the coating system of the present invention was chosen in such a manner as to facilitate the preparation of the coating mixture, to provide suitable application properties, and to provide an environmentally acceptable paint.

Once the base and isocyanate catalyst were mixed together, the direct to metal coatings and enhanced direct to metal coatings were substrates. Tests were run on various sample formulations, according to ASTM B117 procedure, for either 1000, 2000, or 3000 hours. The results were evaluated according to the Keller Corrosion Rating Scale. Examples of coating formulations that were prepared and evaluated are provided below.

Teat Procedure

The coating compositions tested were sprayed onto different metal substrates and allowed to dry (cure) naturally over time, typically about one week. Edges and backs of samples were taped and front surfaces were scribed with an "X" cording to ASTM B117 procedure. Results are shown in Tables 12-14.

TABLE 12

Non-chromium Inhibitor Containing Primer Plus Topcoat.

| Sample Number | *Deft Primer | *Deft Topcoat | **Weight Percent Corrosion Inhibitor in Topcoat | 2000 Hour Salt Fog Rating |
|---|---|---|---|---|
| 396 | 44GY030 | 99GY001 | None | 3,6 |
| 397 | 44GY030 | 99GY001 | 9% $Pr_6O_{11}$ | 3,6 |
| 421 | 44GY030 | 99W009 | None | 3,5 |
| 386 | 44GY030 | 99W009 | 9% $Pr_2O_3$ | 3,6 |
| 401 | 44GY030 | 99W009 | 9% $CeO_2$ | 3,6 |
| 399 | 44BK016 | 99GY001 | 9% $Pr_6O_{11}$ | 3,4 |

*Deft Primer and Deft Topcoat numbers refer to product identification numbers of primer and topcoat formulations, available from Deft Inc., having offices in Irvine, California.

**Weight percent inhibitor pigment based on total weight percent of fully catalyzed and sprayable topcoat.

TABLE 13

Self-priming Topcoat Formulations.

| Sample Number | *Deft Primer | Weight Percent Extender | **Weight Percent Inhibitor in Topcoat | 2000 Hours Salt Fog Rating |
|---|---|---|---|---|
| A-5-A | 03W211 | 44 $CaSO_4 \cdot 2H_2O$ | 8% $Pr_2O_3$ | 3,5 |

*Deft Primer number refers to product identification number of primer formulation, available from Deft Inc., having offices in Irvine, California.

**Weight percent inhibitor pigment based on total weight percent of fully catalyzed and sprayable topcoat.

TABLE 14

Enhanced Self-priming Topcoat Formulations.

| Sample Number | *Deft Coating | **Corrosion Inhibitor/Weight Percent | | **Color Pigment/Weight Percent | | ***Extender/Weight Percent | | 2000 Hr Salt Fog Rating |
|---|---|---|---|---|---|---|---|---|
| 139-057(A) | 97GY088 | $Pr_2O_3$ | 12.89 | Titanium Dioxide | 13.89 | Lo-Vel ® | 25.17 | 1A |
| | | $CaSO_4 \cdot 2H_2O$ | 47.74 | Iron Yellow Oxide | 0.17 | HSF | | |
| | | | | Carbazole Violet | 0.01 | | | |
| | | | | Phthalo Blue | 0.03 | | | |
| 139-059(A) | 97GY089 | $Pr_2O_3$ | 2.14 | Titanium Dioxide | 13.26 | Lo-Vel ® | 24.01 | 1A |
| | | $CaSO_4 \cdot 2H_2O$ | 42.45 | Iron Yellow Oxide | 0.18 | HSF | | |
| | | $Pr_2(SO_4)_3$ | 0.85 | Carbon Black | 0.10 | | | |
| | | $Pr_6O_{11}$ | 16.98 | Phthalo Blue | 0.03 | | | |
| 139-058(A) | 97GY089 | $Pr_6O_{11}$ | 23.62 | Titanium Dioxide | 12.83 | Lo-Vel ® | 23.23 | 2A |
| | | $CaSO_4 \cdot 2H_2O$ | 40.03 | Iron Yellow Oxide | 0.16 | HSF | | |
| | | | | Carbazole Violet | 0.09 | | | |
| | | | | Phthalo Blue | 0.03 | | | |

TABLE 14-continued

Enhanced Self-priming Topcoat Formulations.

| Sample Number | *Deft Coating | **Corrosion Inhibitor/Weight Percent | | **Color Pigment/Weight Percent | | ***Extender/ Weight Percent | | 2000 Hr Salt Fog Rating |
|---|---|---|---|---|---|---|---|---|
| 148-079(A) | 97GY089 | $Pr_2O_3$ | 2.49 | Titanium Dioxide | 10.25 | Lo-Vel® HSF | 17.48 | 1A |
| | | $CaSO_4 \cdot 2H_2O$ | 48.97 | Iron Yellow Oxide | 0.13 | | | |
| | | $Pr_2(SO_4)_3$ | 0.99 | Carbazole Violet | 0.01 | | | |
| | | $Pr_6O_{11}$ | 19.58 | Carbon Black | 0.07 | | | |
| | | | | Phthalo Blue | 0.03 | | | |
| 148-097(A) | 97GY128 | $Pr_2O_3$ | 1.54 | Titanium Dioxide | 18.85 | Lo-Vel® HSF | 35.69 | 3A |
| | | $CaSO_4 \cdot 2H_2O$ | 30.63 | Iron Yellow Oxide | 0.24 | | | |
| | | $Pr_2(SO_4)_3$ | 0.61 | Carbazole Violet | 0.01 | | | |
| | | $Pr_6O_{11}$ | 12.25 | Carbon Black | 0.13 | | | |
| | | | | Phthalo Blue | 0.05 | | | |
| 148-078(A) | 97GY121 | $Pr_2O_3$ | 14.98 | Titanium Dioxide | 10.82 | Lo-Vel® HSF | 18.47 | 1A |
| | | $CaSO_4 \cdot 2H_2O$ | 55.48 | Iron Yellow Oxide | 0.14 | | | |
| | | | | Carbazole Violet | 0.01 | | | |
| | | | | Carbon Black | 0.07 | | | |
| | | | | Phthalo Blue | 0.03 | | | |
| 148-084(A) | 97GY124 | $Pr_2O_3$ | 2.14 | Titanium Dioxide | 19.45 | Lo-Vel® HSF | 36.85 | 3A |
| | | $CaSO_4 \cdot 2H_2O$ | 42.45 | Iron Yellow Oxide | 0.24 | | | |
| | | $Pr_2(SO_4)_3$ | 0.85 | Carbazole Violet | 0.01 | | | |
| | | $Pr_6O_{11}$ | 16.98 | Carbon Black | 0.13 | | | |
| | | | | Phthalo Blue | 0.05 | | | |

*Deft Coating number refers to product identification number of coating formulation, available from Deft Inc., having offices in Irvine, California.
**Weight percent of inhibitor and pigment is based on the total weight percent of fully catalyzed and sprayable topcoat.
***Weight percent of extender is based on the total weight percent of fully catalyzed and sprayable topcoat.
Lo-Vel® HSF, available from PPG Industries, having offices in Pittsburgh, PA.

As shown in Tables 12-14, incorporating extenders in conjunction rare earth corrosion inhibitors into the enhanced self-priming topcoat results in coating compositions with good or excellent performance. As shown in Table 14, the extenders in conjunction with the rare earth corrosion inhibitors when incorporated into the enhanced self-priming topcoat, provides the best corrosion resistance. As shown in Table 12, incorporating corrosion inhibitors directly into a topcoat and applying over a non-chrome primer, results in coating systems that do not perform as well as the coatings shown in Table 14. As shown in Table 13, the corrosion resistance of the self-priming topcoat with extenders and rare earth compound corrosion inhibitors is comparable to the performance of the non-chrome primer and topcoat formulations shown in Table 12. Thus, the self-priming topcoat compositions, according to the present invention, can achieve similar performance to systems that use both a non-chrome primer and a topcoat, without the use of a primer. Further, as shown in Table 14, the enhanced self-priming topcoats perform better than the non-chrome primer plus topcoat systems, thus providing better corrosion protection as a one-coat system without the need for a inter-coat polymeric coating or primer. Accordingly, the enhanced self-priming topcoats have both excellent weathering resistance and durability, as well as the corrosion resistance necessary to provide protection to underlying substrates.

Further, the coating compositions according to the present invention are non-chromium containing and are environmentally superior to currently known chromium containing coating systems. Finally the self-priming topcoat and enhanced self-priming topcoat compositions provide corrosion protection as a one-coat system without the need for an inter-coat polymeric coating or primer, thus minimizing the production time and costs of producing industrial, consumer, and military parts and goods.

CONCLUSION

As shown herein, the addition of corrosion-inhibiting carbon pigments enhance the corrosion inhibiting properties of a variety of coating compositions. Although the precise mechanism through which the corrosion-inhibiting carbon pigments function is not known, it was found that in most cases the presence of corrosion-inhibiting carbon pigments improved corrosion resistance of the coating system. Also, a specific surfactant dispersed and/or resin dispersed carbon black can be beneficial, but their presence can also help disperse other pigment components.

It is also known that carbon can effectively serve as either an anode or cathode in electrolytic processes because of its chemical and mechanical stability, good conductivity, availability in a range of structural forms to tailor surface reaction kinetics, ability to chemically modify the surface and relatively low cost. Some forms of carbon reported to be used as electrodes include: graphite of various grades and porosities, vitreous carbon and pyrolytic graphite, reticulated carbon, carbon fibers, spheres and flakes, surface-modified carbons and intercalated carbon.

While not serving directly in a half-cell reaction, carbon will act as an excellent substrate surface to enhance other chemical and electrochemical reactions. In addition, the open structure described previously could provide effective transport avenues for the inhibitor species present in the point to reach the sites where corrosion might initiate.

Therefore, it is speculated that one feature of the carbonaceous materials that is responsible for providing improved corrosion protection and improved overall electrochemical activity is as a high surface area depolarizing agent for oxygen reduction. In this mechanism, it is thought that the carbon is serving as a local cathode, allowing an increase in the oxidation and activity of the inorganic inhibiting species added to the paint. The adsorption properties of carbon could also provide sites for the capture of any impurities that would cause increased corrosion.

Thus, while carbon would not be expected to provide direct chemical or electrochemical protection from corrosion, and, in fact, it was thought that it could be detrimental in this regard (See U.S. Pat. No. 4,544,581), the present invention demonstrates, for the first time, that under the proper circumstances it is feasible that carbon can provide the proper environment to give substantial assistance to the long term corrosion resistance of metal surfaces. This can be particularly true when present in conjunction with more conventional paint inhibitors, such as chromates, Nalzan™, Busan™, Halox™, Molywhite™, conducting polymers, and the like. Enhancing the overall corrosion inhibition activity is the primary role of carbon as a constituent in paint. The present invention provides the additional advantage of having no chromates, such as strontium chromate, etc. and is therefore environmentally superior to currently known chromium containing coating systems.

All publications, patents and patent applications are incorporated herein by reference. While in the foregoing specification, this invention has been described in relation to certain preferred embodiments thereof, and many details have been set forth for purposes of illustration, it will be apparent to those skilled in the art that the invention is susceptible to additional embodiments and that certain of the details herein may be varied considerably without departing from the basic principles of the invention. Therefore, it is manifestly intended that this invention be limited only by the claims and the equivalents thereof.

What is claimed is:

1. A non-chromate containing coating composition comprising:
   one or more corrosion-inhibiting carbon pigments in an effective corrosion-inhibiting amount;
   one or more rare earth compounds;
   one or more substantially insoluble inorganic extenders selected from the group consisting of a neutral to slightly acidic generating extender, an acidic generating extender, and combinations thereof; and
   one or more binders;
   wherein at least one of the one or more inorganic extenders is calcium sulfate, calcium hydrogen sulfate, calcium phosphate, calcium hydrogen phosphate, calcium dihydrogen phosphate or combinations thereof; and
   wherein the non-chromate containing composition is capable of curing naturally and, upon curing, is capable of generating a pH between about 2 and about 8 at an interface between the composition and a substrate.

2. The coating composition of claim 1 further comprising one or more amino acids.

3. The coating composition of claim 1 wherein at least one of the one or more corrosion-inhibiting carbon pigments is an amorphous form of carbon.

4. The coating composition of claim 1 wherein the one or more corrosion-inhibiting carbon pigments are present in the composition in a weight percent range of between about 0.1 to about 100% of total pigment concentration.

5. The coating composition of claim 1 wherein the coating composition has a pigment volume concentration of between about 5 to about 55.

6. The coating composition of claim 1 wherein at least one of the one or more binders is an organic binder.

7. The coating composition of claim 1 wherein at least one of the one or more binders is an epoxy-based resin binder.

8. The coating composition of claim 7 wherein the epoxy-based resin binder is an amine-cured epoxy-based resin binder.

9. The coating composition of claim 1 wherein the one or more inorganic extenders are present in the composition in a weight percent of between about 45% to about 75% of total pigment concentration.

10. The coating composition of claim 1 further comprising one or more corrosion co-inhibitors.

11. The coating composition of claim 10 wherein at least one of the one or more corrosion co-inhibitors is said rare earth compound.

12. The coating composition of claim 11 wherein the one or more inorganic extenders are present in the composition in a weight percent of between about 25% to about 98% of total pigment concentration.

13. The coating composition of claim 11 wherein at least one of the one or more binders is an epoxy-based resin binder.

14. The coating composition of claim 11 comprising at least two corrosion co-inhibitors.

15. The coating composition of claim 1 wherein the corrosion-inhibiting carbon pigments are present in the composition in a weight percent range of between about 3% to about 25% of total pigment concentration.

16. The coating composition of claim 1 wherein: the one or more rare earth compounds is present in the composition in a weight percent from between about 0.4% to about 26% of total pigment concentration; the corrosion-inhibiting carbon pigment is present in the composition in a weight percent from between about 30% to about 25% of total pigment concentration; and the one or more extenders is present in the composition in a weight percent from between about 25% to about 98% of total pigment concentration.

17. The coating composition of claim 1 wherein the corrosion-inhibiting carbon pigment is present in the composition in a weight percent of at least about 6% of total pigment concentration.

18. The coating composition of claim 1 wherein the effective corrosion-inhibiting amount of the one or more corrosion-inhibiting carbon pigments is an amount which provides the coating composition with at least a 2, 4 A rating on the Keller Corrosion Rating Scale for a 500 hour salt fog test, as tested according to ASTM B117 procedure.

19. The coating composition of claim 1 wherein the effective corrosion-inhibiting amount of the corrosion-inhibiting carbon pigment is at least about 6 wt %, and the coating composition has at least a 2, 4 A rating on the Keller Corrosion Rating Scale for a 500 hour salt fog test, as tested according to ASTM B117 procedure.

20. The coating composition of claim 1 wherein the one or more inorganic extenders are present in the composition in a weight percent of between about 25% to about 98% of total pigment concentration.

21. The coating composition of claim 1 wherein the one or more inorganic extenders are present in the composition in a weight percent of between about 80% to about 95% of total pigment concentration.

22. The composition of claim 1 wherein the calcium sulfate is hydrous calcium sulfate, anhydrous calcium sulfate or combinations thereof.

23. A non-chromate containing coating composition comprising:
   one or more corrosion-inhibiting carbon pigments in an effective corrosion-inhibiting amount;

one or more substantially insoluble inorganic extenders selected from the group consisting of a neutral to slightly acidic generating extender, an acidic generating extender, and combinations thereof;

one or more binders; and one or more corrosion co-inhibitors, wherein at least one of the one or more corrosion co-inhibitors is a rare earth compound and wherein the rare earth compound is a salt of a rare earth-containing compound selected from the group consisting of a hydroxide of a rare earth-containing compound, an oxide of a rare earth-containing compound, a solid solution mixed oxide of a rare earth-containing compound, and combinations thereof;

wherein the non-chromate containing composition is capable of curing naturally and, upon curing, is capable of generating a pH between about 2 and about 8 at an interface between the composition and a substrate.

24. The coating composition of claim 23 wherein the rare earth compound is selected from the group consisting of cerium oxide, cerium hydroxide, cerium solid solution mixed oxide, cerium oxide mixture, cerium salt, neodymium oxide, neodymium hydroxide, neodymium oxide mixture, neodymium salt, praseodymium oxide, praseodymium hydroxide, praseodymium solid solution mixed oxide, praseodymium oxide mixture, praseodymium salt, ytterbium oxide, ytterbium hydroxide, ytterbium solid solution mixed oxide, ytterbium oxide mixture, ytterbium salt, yttrium oxide, yttrium hydroxide, yttrium oxide mixture, yttrium salt, terbium oxide, terbium hydroxide, terbium solid solution mixed oxide, terbium oxide mixture, terbium salt, and combinations thereof.

25. A non-chromate containing coating composition comprising:

one or more corrosion-inhibiting carbon pigments in an effective corrosion-inhibiting amount;

one or more substantially insoluble inorganic extenders selected from the group consisting of a neutral to slightly acidic generating extender, an acidic generating extender, and combinations thereof;

one or more binders; and one or more corrosion co-inhibitors, wherein at least one of the one or more corrosion co-inhibitors is a rare earth compound and wherein the rare earth compound is a praseodymium compound selected from the group consisting of a praseodymium solid solution mixed oxide, a praseodymium (III) oxide, a praseodymium(III) hydroxide, a praseodymium(IV) oxide, and combinations thereof; and wherein the non-chromate containing composition is capable of curing naturally and, upon curing, is capable of generating a pH between about 2 and about 8 at an interface between the composition and a substrate.

26. A non-chromate containing coating composition comprising:

one or more corrosion-inhibiting carbon pigments in an effective corrosion-inhibiting amount;

one or more substantially insoluble inorganic extenders selected from the group consisting of a neutral to slightly acidic generating extender, an acidic generating extender, and combinations thereof;

one or more rare earth compounds; and one or more binders;

wherein the one or more rare earth compounds is a praseodymium(III) sulfate or a praseodymium(III/IV) oxide;

wherein the non-chromate containing composition is capable of curing naturally and, upon curing, is capable of generating a pH between about 2 and about 8 at an interface between the composition and a substrate.

27. A method of preparing a non-chromate containing coating composition, the method comprising:

preparing a mill base having one or more binders;

adding to the mill base an effective corrosion-inhibiting amount of one or more corrosion-inhibiting carbon pigments, and one or more substantially insoluble extenders selected from the group consisting of a neutral to slightly acidic generating extender, an acidic generating extender, and combinations thereof; and adding to the mill base one or more rare earth compounds, and optionally one or more additives, or combinations thereof to produce the coating composition;

wherein the non-chromate containing composition is capable of curing naturally and, upon curing, is capable of generating a pH between about 2 and about 8 at an interface between the composition and a substrate.

28. A non-chromate containing coating system comprising:

one or more pretreatment coatings applied to a substrate to form a pretreated substrate;

a coating composition applied to the pretreated substrate, the composition including:

one or more corrosion-inhibiting carbon pigments in an effective corrosion-inhibiting amount;

one or more binders;

one or more substantially insoluble inorganic extenders selected from the group consisting of a neutral to slightly acidic generating extender, an acidic generating extender, and combinations thereof;

one or more rare earth compounds: and a topcoat; and wherein the non-chromate containing composition is capable of curing naturally and, upon curing, is capable of generating a pH between about 2 and about 8 at an interface between the composition and a substrate.

29. The coating system of claim 28 wherein at least one of the one or more binders is a resin-binder.

30. The coating composition of claim 29 wherein the resin binder is an epoxy-based resin binder.

31. The coating system of claim 28 wherein the coating composition and the one or more pretreatment coatings are each independently cured naturally or by exposure to heat, UV energy, microwave energy, or combinations thereof.

32. The coating system of claim 28 wherein the pretreated substrate is coated by a method of application selected from the group consisting of spraying, brushing, rolling and dipping.

33. The coating system of claim 28 wherein the system comprises a water-borne system, a solvent-borne system, a powder system or an appliqué system, wherein the coating system can be different for the coating composition and the one or more pretreatment coatings.

34. The coating system of claim 28 wherein the coating composition, the one or more pretreatment coatings, or both are applied to the substrate by an electrolytic coating method.

35. A non-chromate containing coating system comprising:

a coating composition applied to a substrate, the composition including:

one or more corrosion-inhibiting carbon pigments in an effective corrosion-inhibiting amount;

one or more rare earth compounds;

one or more substantially insoluble inorganic extenders selected from the group consisting of a neutral to slightly acidic generating extender, an acidic generating extender, and combinations thereof; and one or more binders;

wherein at least one of the one or more binders is an epoxy-based resin binder and wherein the non-chromate containing composition is capable of curing naturally and, upon curing, is capable of generating a pH between about 2 and about 8 at an interface between the composition and a substrate.

36. The coating system of claim 35 wherein the system further comprises one or more pretreatment coatings applied to the substrate to form a pretreated substrate and a topcoat.

37. The coating system of claim 36 wherein the topcoat is a urethane topcoat.

38. The coating system of claim 35 wherein the coating composition is cured naturally or with an accelerated method of curing which exposes the coating composition to heat, UV energy, microwave energy, or combinations thereof.

39. The coating system of claim 35 wherein the substrate is coated by a method of application selected from the group consisting of spraying, brushing, rolling and dipping.

40. The coating system of claim 35 wherein the substrate is a composite substrate.

41. The coating system of claim 35 wherein the substrate is selected from the group consisting of aluminum, aluminum alloys, steel, galvanized steel, zinc, zinc alloys, magnesium, and magnesium alloys.

42. The coating system of claim 35 wherein the system is a water-borne system, a solvent-borne system, a powder system or an appliqué system.

43. The coating system of claim 35 wherein the coating composition is applied to the substrate by an electrolytic coating method.

44. A non-chromate containing coating system comprising:

a coating composition applied to a substrate, the composition including:

one or more corrosion-inhibiting carbon pigments in an effective corrosion-inhibiting amount;

one or more rare earth compounds;

one or more substantially insoluble inorganic extenders selected from the group consisting of a neutral to slightly acidic generating extender, an acidic generating extender, and combinations thereof; and one or more binders;

wherein the substrate is aluminum, an aluminum alloy, magnesium or a magnesium alloy;

wherein the non-chromate containing composition is capable of curing naturally and, upon curing, is capable of generating a pH between about 2 and about 8 at an interface between the composition and a substrate.

45. A non-chromate containing coating system comprising:

one or more pretreatment coatings applied to a substrate to form a pretreated substrate; and a coating composition applied to the pretreated substrate, the composition including:

one or more corrosion-inhibiting carbon pigments in an effective corrosion-inhibiting amount;

one or more rare earth compounds;

one or more substantially insoluble inorganic extenders selected from the group consisting of a neutral to slightly acidic generating extender, an acidic generating extender, and combinations thereof; and one or more binders;

wherein the substrate is aluminum, an aluminum alloy, magnesium or a magnesium alloy;

wherein the non-chromate containing composition is capable of curing naturally and, upon curing, is capable of generating a pH between about 2 and about 8 at an interface between the composition and a substrate.

46. The coating system of claim 45 wherein the system further comprises a topcoat.

47. The coating system of claim 46 wherein the topcoat is a urethane topcoat.

48. The coating system of claim 45 wherein at least one of the one or more binders is a resin binder.

49. The coating composition of claim 48 wherein the resin binder is an epoxy-based resin binder.

50. The coating system of claim 45 wherein the coating composition is cured naturally or with an accelerated method of curing which exposes the coating composition to heat, UV energy, microwave energy, or combinations thereof.

51. The coating system of claim 45 wherein the pretreated substrate is coated by a method of application selected from the group consisting of spraying, brushing, rolling and dipping.

52. The coating system of claim 45 wherein the pretreated substrate is a composite substrate.

53. The coating system of claim 45 wherein the system is a water-borne system, a solvent-borne system, a powder system or an appliqué system.

54. The coating system of claim 45 wherein the coating composition is applied to the substrate by an electrolytic coating method.

* * * * *

UNITED STATES PATENT AND TRADEMARK OFFICE
CERTIFICATE OF CORRECTION

PATENT NO. : 7,601,425 B2
APPLICATION NO. : 10/758973
DATED : October 13, 2009
INVENTOR(S) : James Stoffer et al.

It is certified that error appears in the above-identified patent and that said Letters Patent is hereby corrected as shown below:

On page 3, in column 1, under "Other Publications", line 1, delete "Inhibitionwith" and insert -- Inhibition with --, therefor.

On page 3, in column 1, under "Other Publications", line 14, delete "Ce-HClO4-H2O" and insert -- Ce-HClO$_4$-H$_2$O --, therefor.

In column 4, line 61, delete "pigment,." and insert -- pigment, --, therefor.

In column 7, line 1, delete "Neidernhausen," and insert -- Niedernhausen, --, therefor.

In column 9, line 21, delete "to a" and insert -- to a mixture --, therefor.

In column 11, line 36, delete "0. I" and insert -- 0.1 --, therefor.

In column 11, line 49, delete "Ravens®" and insert -- Raven® --, therefor.

In column 11, line 62, delete "I" and insert -- 1 --, therefor.

In column 14, line 6, delete "Highstown," and insert -- Hightstown, --, therefor.

In column 16, line 58, delete ""1" "A"" and insert -- "1" and "A" --, therefor.

In column 16, line 60, delete "ratings).," and insert -- ratings). --, therefor.

In columns 21-22, in "Table 1", line 16, delete "1/7 Sun" and insert -- Sun --, therefor.

In columns 23-24, in "Table 1", line 17, delete "L-Cystiene:" and insert
-- L-Cysteine: --, therefor.

In columns 23-24, in "Table 1", line 18, delete "Cystene:" and insert -- Cysteine: --, therefor.

In column 27, line 45, delete "CaSO$_4$ 2H$_2$O" and insert -- CaSO$_4$•2H$_2$O --, therefor.

In column 28, line 40, delete "1 1/64" and insert -- 1/64 --, therefor.

UNITED STATES PATENT AND TRADEMARK OFFICE
CERTIFICATE OF CORRECTION

PATENT NO. : 7,601,425 B2
APPLICATION NO. : 10/758973
DATED : October 13, 2009
INVENTOR(S) : James Stoffer et al.

It is certified that error appears in the above-identified patent and that said Letters Patent is hereby corrected as shown below:

In column 33, line 47, delete "Teat" and insert -- Test --, therefor.

In column 34, lines 4-5, delete "cording to" and insert -- pattern according to --, therefor.

In column 38, line 32, in Claim 16, delete "30%" and insert -- 3% --, therefor.

Signed and Sealed this

Twenty-ninth Day of December, 2009

David J. Kappos
*Director of the United States Patent and Trademark Office*